United States Patent
Wymore et al.

(10) Patent No.: US 10,407,110 B2
(45) Date of Patent: Sep. 10, 2019

(54) MOTOR VEHICLE FENDER

(71) Applicant: Iddea California, LLC, Brea, CA (US)

(72) Inventors: Timothy J. Wymore, Brea, CA (US); Rodolfo A. Linares, Brea, CA (US)

(73) Assignee: NAADE, Inc., Laredo, TX (US)

( * ) Notice: Subject to any disclaimer, the term of this patent is extended or adjusted under 35 U.S.C. 154(b) by 40 days.

(21) Appl. No.: 15/795,698

(22) Filed: Oct. 27, 2017

(65) Prior Publication Data

US 2019/0126991 A1    May 2, 2019

(51) Int. Cl.
  *B62D 25/18*  (2006.01)
  *B62D 25/16*  (2006.01)

(52) U.S. Cl.
  CPC ............. *B62D 25/18* (2013.01); *B62D 25/16* (2013.01); *B62D 25/163* (2013.01); *B62D 25/168* (2013.01)

(58) Field of Classification Search
  CPC ...... B62D 25/02; B62D 25/16; B62D 25/163; B62D 25/168; B62D 25/18
  USPC ......................................................... 296/198
  See application file for complete search history.

(56) References Cited

U.S. PATENT DOCUMENTS

| 6,155,624 | A | 12/2000 | Bienenstein, Jr. |
| 8,146,987 | B2 | 4/2012 | Uchino |
| 2008/0231082 | A1 | 9/2008 | Mathew |
| 2010/0253034 | A1* | 10/2010 | Crismon ............ B62D 25/163 280/154 |

FOREIGN PATENT DOCUMENTS

| EP | 0041353 A1 * | 12/1981 | ........... B62D 25/161 |
| JP | 59034982 A * | 2/1984 | ............. B62D 25/18 |

OTHER PUBLICATIONS

Google Search, jeep replacement fenders, web page <hhttps://www.google.com/search?q=jeep+replacement+fenders&source=lnms&tbm=shop&sa=X&ved=0ahUKEwiPIYfcjtHYAhVRHGMKHXUSA6kQ_AUICigB8ibiw=1329&bih=737>, Jan. 5, 2018, 4 pages.
Amazon.com, fenders jeep wrangler, web page <https://www.amazon.com/s/ref=nb_sb_noss_2?url=search-alias%3Daps&field-keywords=fenders+jeep+wrangler>, Jan. 11, 2018, 14 pages.

* cited by examiner

*Primary Examiner* — Jason S Daniels
(74) *Attorney, Agent, or Firm* — Stetina Brunda Garred and Brucker

(57) ABSTRACT

A motor vehicle fender has inner and outer sides joined to top and bottom covers to form a four sided, closed structure having a downward extending front portion, generally straight middle portion and a downwardly extending rear portion encircling the top portion of a wheel well of a motor vehicle. The top cover angles inward toward the vehicle and downward toward the ground so the top, outer edge of the fender protrudes to deflect vegetation from the top of the fender, and the outer side angles inward and downward so the top, outer edge protrudes to deflect vertically growing vegetation from parts of the outer side of the fender.

23 Claims, 15 Drawing Sheets

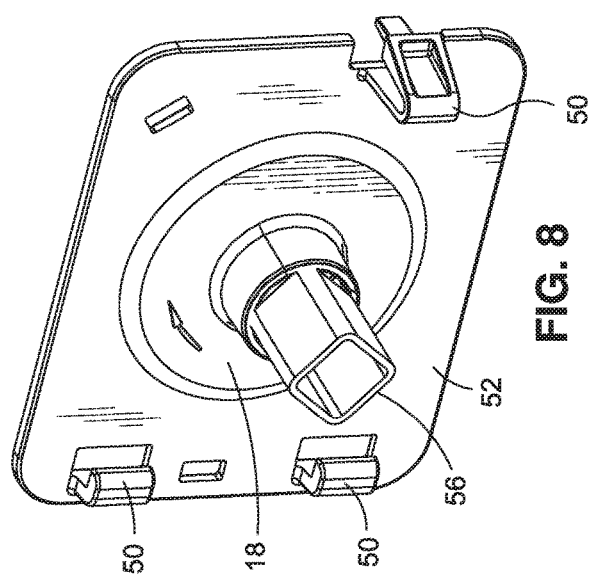
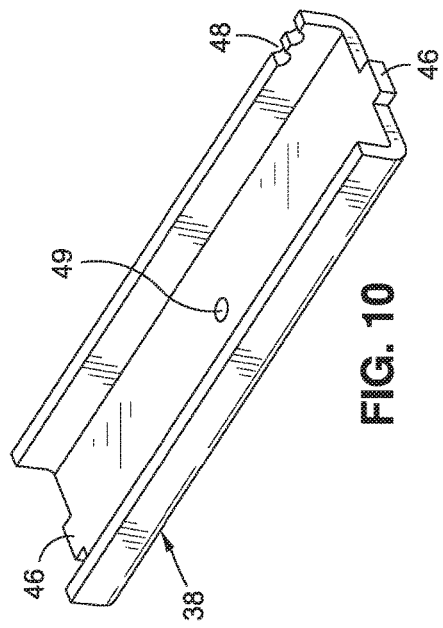
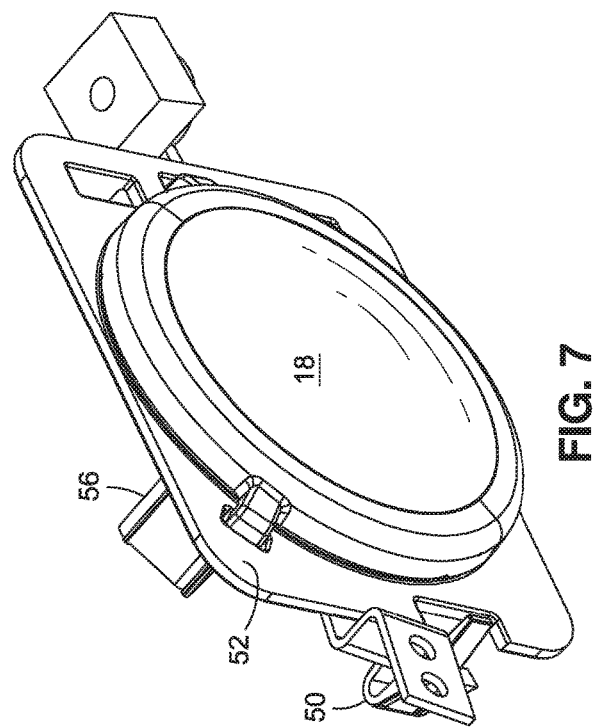
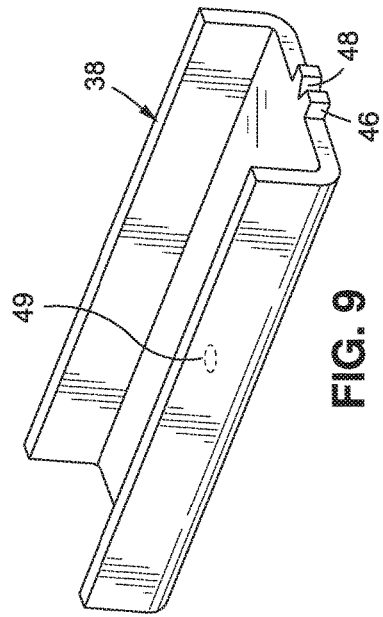

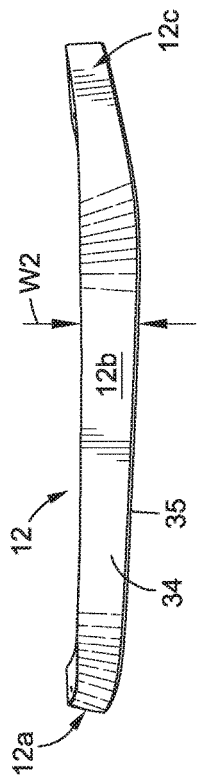
FIG. 21A
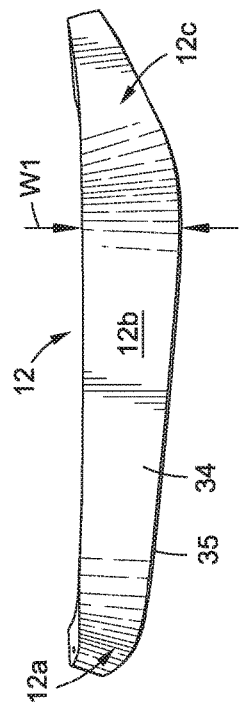
FIG. 22A
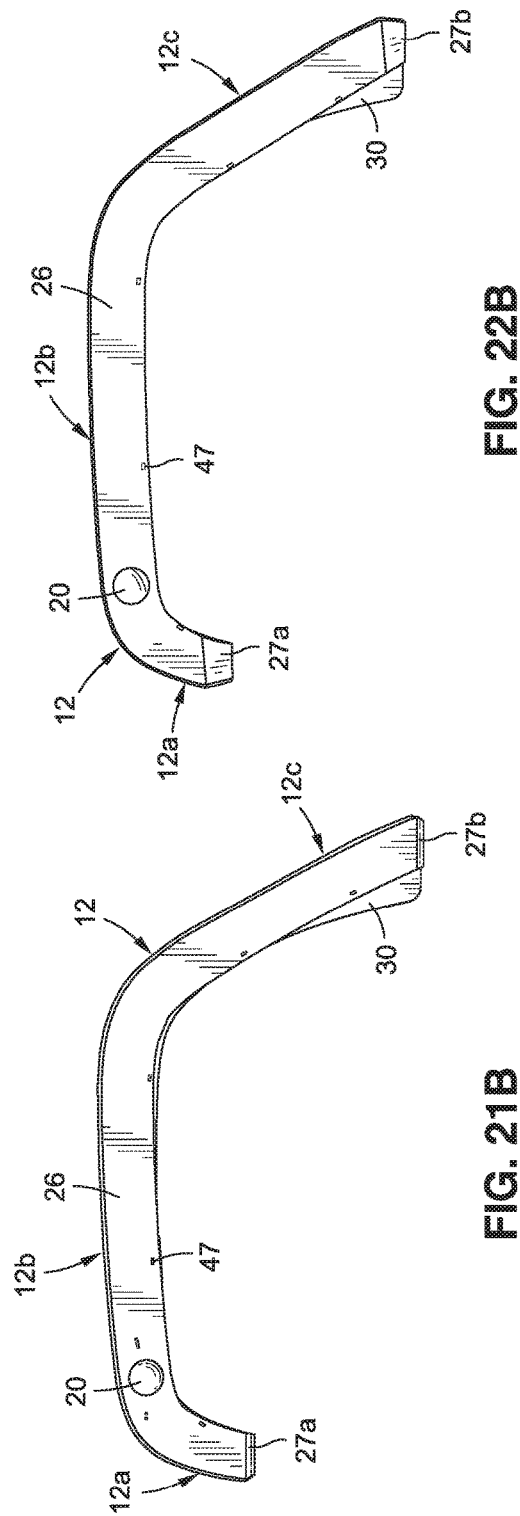
FIG. 21B
FIG. 22B

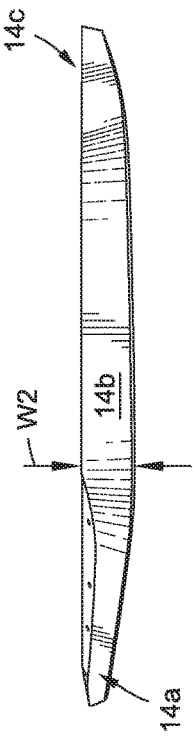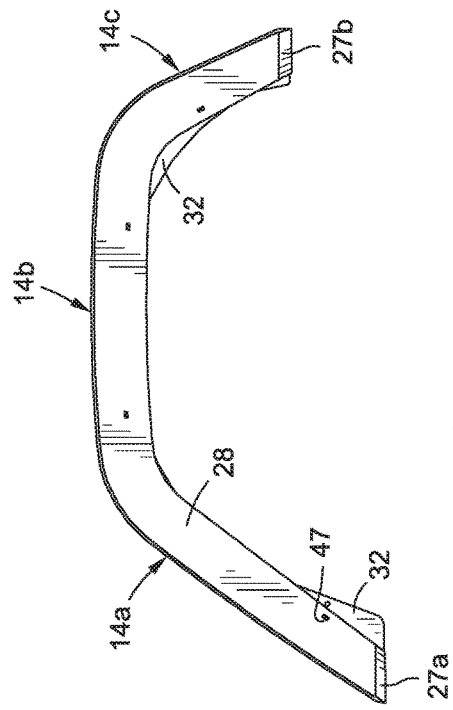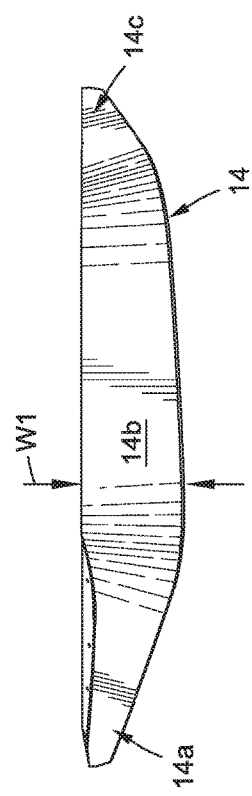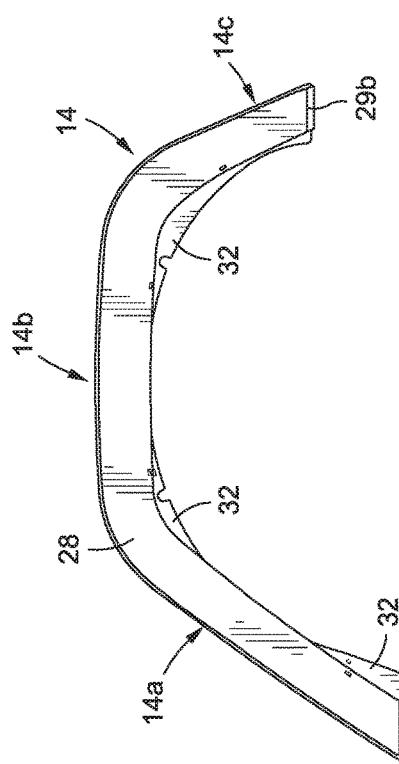

MOTOR VEHICLE FENDER

CROSS-REFERENCE TO RELATED APPLICATIONS

Not applicable.

STATEMENT RE: FEDERALLY SPONSORED RESEARCH/DEVELOPMENT

Not applicable.

BACKGROUND

Motor vehicles designed for off-road use include the Jeep® brand motor vehicle. These vehicles have fenders over each wheel that extend outward and slightly downward from the vehicle body to which they are removably fastened, usually by various bolts. The front fenders have turn signals. The factory installed fenders are subject to damage by debris as well as various type of vegetation, including trees, shrubbery and overhanging branches and vines as may be encountered in back-road or off-road use. Unfortunately, animals may also be hit by the fenders. There is a need for more sturdy and durable fenders that may withstand greater impacts and forces without deforming, compared to factor fenders.

The fenders typically comprise a formed sheet of material each extending over an upper portion of a wheel located beneath the fender. During back-road and off-road use the wheels throw mud, dirt, insects, seeds and various other debris against the underside or interior side of the adjacent fender and the construction of the fenders allows those materials to be entrapped under the fender. Those entrapped materials are difficult to remove as the underside of the fenders is not accessible to automated car washing equipment and even if manually washed it may be difficult to complete remove all the entrapped material. The result is that mud and debris may be entrapped under the fenders and that can have several undesirable consequences. In addition to increasing corrosion, insects and various plants and seeds may be embedded in the entrapped mud and debris, resulting in the transport of undesirable plants and bugs from remote locations to the vehicle operator's home. Moreover, the entrapped mud, stones and debris may dislodge during highway driving, causing dislodged pebbles to bounce against the side of the vehicle and damage paint, or impact a trailing vehicle and damage paint, lights or windshields. There is thus a need for an improved fender that reduces the adherence and transportation of mud, dirt and debris and allows easier cleaning.

The fenders extend outward from a uniform distance with the result that vegetation in front of the front fender hits what is effectively the front edge a rectangular body and is typically deflected downward or broken, while the vegetation a little further outward from the vehicle avoids the fender entirely. The vegetation impacting the front edge of the fender may damage the fender and the blunt impact is more likely to damage the vegetation. Likewise, animals hit by the laterally extending fender are likely to be injured. There is a need for an improved fender that reduces the potential impact and preferably redirects the potential impact to urge vegetation and animals laterally away from the vehicle.

BRIEF SUMMARY

Improved front and rear fenders are provided that are particularly useful for a Jeep® motor vehicle as well as other vehicles.

The motor vehicle fender has inner and outer sides joined to top and bottom covers to form a four sided, closed structure having a downward extending front portion, generally straight middle portion and a downwardly extending rear portion encircling the top portion of a wheel well and wheel of a motor vehicle. The top cover angles inward toward the vehicle and downward toward the ground so the top, outer edge of the fender protrudes to deflect vegetation from the top of the fender, and the outer side angles inward and downward so the top, outer edge protrudes to deflect vertically growing vegetation from parts of the outer side of the fender. The fender has a four-sided cross-section when the sections are taken orthogonal to the fender's centerline. Two adjacent sides of the cross-section are perpendicular and those sides correspond to the inner mounting plate that bolts to the recessed flange encircling the top part of a wheel well, and correspond to the bottom cover against which debris impacts during use. The other two sides of the cross-section correspond to a top cover and outer side, with those two sides joining at an acute angle which is opposite the 90° angle at which the bottom cover joins the vertical inner mounting plate during use of the vehicle.

In more detail, a fender is provided for a motor vehicle having a body with a recessed flange on the body that encircles an upper portion of a wheel well. The vehicle may have a center plane extending vertically through a longitudinal axis along the middle of the vehicle or through a center of the vehicle, and between front and rear wheels of the vehicle. The fender may include a four sided, enclosed structure having depending front and rear ends joined by a middle section. The front and rear ends extend downward. The four sides include a substantially flat mounting side, an outer side, a top cover and a removable bottom cover. The mounting side is configured to nest in the recessed flange during use. The outer side is opposite the mounting side with a shape substantially the same as that of the mounting side. The outer side has a lower edge generally parallel to but offset from a lower edge of the mounting side. The outer side also has an upper edge located above an upper edge of the middle portion of the mounting side. The top cover is joined to a top edge of each side along substantially the entire length of each side, preferably by spot welding and less preferably by a continuous welded seam. The top cover and outer side each have a middle section corresponding in location to the middle section of the enclosed structure with the middle section of the outer side and top cover each inclined inward toward the vehicle's center plane and downward toward the ground to form an acute angle between the middle portions of the top cover and outer side. The fender may also have a plurality of braces extending between and connected to the inner and outer sides. Preferably the bottom cover and braces have aligned holes for receiving threaded fasteners to releasably fasten the bottom cover to the braces.

In further variations, the fender may include an opening in the outer side configured to receive a turn signal light of the motor vehicle, with the hole located so the wiring harness and turn signal light of the original vehicle may be used. The fender may also have a first downwardly curved section joining the front end to the middle section of the enclosed structure and a second downwardly curved section joining the rear end to the middle section of the enclosed structure.

In further variations, the acute angle is about 45° to about 65°. Preferably, the middle portion of the top cover is inclined at an angle of about 15° to about 25° to the horizontal during use. Advantageously, the middle portion of the outer side is also inclined and preferably at an angle of about 5° to about 20° to the vertical during use. Advantageously the fender's bottom cover is orthogonal to a plane containing the substantially flat mounting side, so the bottom cover is perpendicular to the mounting side. The acute angle is preferably located diagonally opposite the perpendicular joint.

Also, the fender may include a lateral brace having opposing flanges parallel to the mounting side and further having an outer side connected to the fender during use and a mounting side connected to the motor vehicle during use. The fender may also include an elongated support having opposing ends connected to the vehicle during use, and a lateral support extending generally parallel to the bottom cover with the support having a length sufficient to extend underneath one of the braces and be connected to that one of the braces. The braces may have a U-shaped cross-section with a rectangular projection extending outward from opposing ends of the brace, and advantageously the inner and outer sides each have aligned rectangular slots to receive different ones of the projections.

Preferably, the braces are welded to the sides. Similarly, the top cover may be joined to the top edge of each side by a welded joint. The enclosed structure preferably has a four-sided cross-section along substantially all of its length from the bottom of the front end to bottom of the rear end, which cross-section is orthogonal to a centerline of the fender and has the mounting side and bottom cover perpendicular to each other and forming two of the four sides of the cross-section.

In still further variations, the front end of the enclosed structure or fender is shorter than the rear end of the enclosed structure. The front end of the enclosed structure or fender may be longer than the rear end of the enclosed structure. The front end of the enclosed structure or fender may have a straight portion inclined forward and downward for a majority of a length of the front end of the enclosed structure or fender. Advantageously, the bottom of front and rear ends of the enclosed structure that are closest to the ground, are each closed so debris cannot enter.

In still more detail, there is also advantageously provided a fender for a motor vehicle having a body with a recessed flange on the body that encircles an upper portion of a wheel well where the recessed flange has a generally horizontal middle portion with a front flange end curving downward from a front end of the middle flange portion and a rear flange end curving downward from a rear end of the middle flange portion. The fender, when in the orientation used on the motor vehicle, includes an inner mounting plate that is generally flat and vertical. The inner mounting plate may have the same general shape as the recessed flange and is preferably sized to fit in the recess formed by the recessed flange. The mounting plate has a middle portion with a generally uniform height and a top edge. The mounting plate also has a front mounting plate end curving downward and conforming in shape to the front flange end of the recessed flange. The mounting plate also has a rear mounting plate end curving downward and conforming in shape to the rear flange end of the recessed flange. One of the front and rear mounting plate ends extends downward further than the other.

This fender also includes a top cover having opposed inner and outer edges with the inner edge permanently joined to a top edge of the mounting plate along substantially all of the mounting plate. The top cover also has a substantially flat middle portion joined to a downward extending front end of the top cover and also joined to a downwardly extending rear end of the top cover. The middle portion of the top cover has its outer edge a distance W from the inner edge of the top cover as measured along the top cover. That width is smaller at the front of the middle portion of the top cover, and larger at the rear of the middle portion of the top cover. The middle portion of the top cover may also have its outer edge located a vertical distance above the top edge of the mounting plate so the middle portion of the top cover is inclined inward toward the vehicle and downward toward the ground.

This fender also includes an outer side having a front end that curves downward and a rear end curving downward, with one of the front and rear ends of the outer side extending downward further than the other. The outer side may also have substantially the same shape as the inner mounting plate but with a larger distance between opposing edges of the outer side than the distance between opposing edges of the inner mounting plate along at least the middle portion of the outer side. The outer edge of the top cover is advantageously joined to the top edge of the outer side along substantially all of the top cover and joined along at least the middle portion of the outer cover with an acute angle between the top cover and the outer side.

This fender also may include a plurality of braces extending laterally between and connected to the inner mounting plate and the outer cover, with a bottom cover fastened to the braces. The bottom cover extends between the inner mounting plate and has a downwardly extending front portion joining a middle portion with joins a downwardly extending rear portion of the bottom cover. A plurality of threaded fasteners releasably connect the bottom cover to the braces which are located between the bottom cover and the top cover.

In this fender, the above described top and bottom covers and the inner and outer sides form a four-sided, closed structure having a four-sided cross-section along substantially all of the length of the inner mounting plate from the bottom of the front end to bottom of the rear end of the mounting. That cross-section is orthogonal to a centerline of the fender and has the inner mounting plate and bottom cover perpendicular to each other. The top cover joins the outer side at an acute angle along at least the middle portion of the top cover and the outer side. The acute angle is opposite the perpendicular juncture of the inner mounting plate and the bottom cover.

In further variations of this fender, a bottom of the front end closest to the ground is covered by one of the inner mounting plate, outer side, top cover or bottom cover so no debris enter the fender. This fender may also include an opening in the outer side, configured to receive a turn signal light of the motor vehicle without altering the light or the electrical harness provided with the vehicle. The acute angle may be about 45° to about 65°. The middle portion of the outer side may also be inclined, preferably at an angle of about 5° to about 20° to the vertical.

The fender may be made of a durable polymer, but is preferably made of metal, with the top cover welded to the inner mounting side and the outer side. The fender preferably has a downwardly extending rear end that is longer than the front end. The fender may optionally have a downwardly extending front end is longer than a downwardly extending rear end. Moreover, the front end of the fender may also have a straight portion inclined forward and downward for a majority of a length of the front end.

BRIEF DESCRIPTION OF THE DRAWINGS

These and other advantages and features of the invention will be better appreciated in view of the following drawings and descriptions in which like numbers refer to like parts throughout, and in which:

FIG. 7 is a front view of a turn signal indicator also shown in FIG. 3;

FIG. 8 is a back view of the turn signal indicator of FIG. 7;

FIG. 9 is a perspective view of a first brace;

FIG. 10 is a perspective view of a second brace;

FIG. 21A is a top view of a wide width, left front fender with the opposing front fender being a mirror image thereof;

FIG. 21B is a side view looking toward the vehicle, of the fender of FIG. 21A;

FIG. 22A is a top view of a narrow width, left front fender with the opposing front fender being a mirror image thereof;

FIG. 22B is a side view looking toward the vehicle, of the fender of FIG. 21A;

FIG. 23A is a top view of a wide width, left rear fender with the opposing front fender being a mirror image thereof;

FIG. 23B is a side view looking toward the vehicle, of the fender of FIG. 21A;

FIG. 24A is a top view of a narrow width, left rear fender with the opposing front fender being a mirror image thereof;

FIG. 24B is a side view looking toward the vehicle, of the fender of FIG. 21A;

DETAILED DESCRIPTION

As used herein, the following parts numbers generally refer to the following parts: 10—motor vehicle; 12—front fender; 12*a*—front end; 12*b*—middle portion; 12*c*—back; 14—rear fender; 14*a*—front end; 14*b*—middle portion; 14*c*—back; 18—turn signal; 20—opening in fender for signal; 22—wire harness for signal; 26—outer side of front fender; 27*a,b*—laterally extending, bottom end; 28—outer side of rear fender; 29*a,b* laterally extending, bottom end; 30—inward side of front fender; 32—inward side of rear fender; 34—top of front fender; 35—vertex on front fender; 36—top of rear fender; 37—vertex on rear fender; 38—brace; 40—bottom cover—front fender; 42—bottom cover—rear fender; 44—threaded fastener; 46—projection on brace; 47—shaped holes in sides; 48—recess on bracket; 49—holes in brace; 50—projections; 52—bracket for signal; 54—holes for projections 50; 56—socket; 58—recessed portion; 59—recess in side 30; 60—left, front frame; 61—upper beam; 62—left, front outer-panel; 64—recessed flange in front, outer-panel; 66—lateral bracket; 68*a,b*—sides of lateral bracket; 70—web joining sides 68; 71—frame mounting bracket; 72—front end; 74—rear end; 76—fastener holes; 78—mounting support; 80—bracket; 82—vertical leg of bracket 80; 92—rear panel; and 94—recessed flange.

Figure 1:
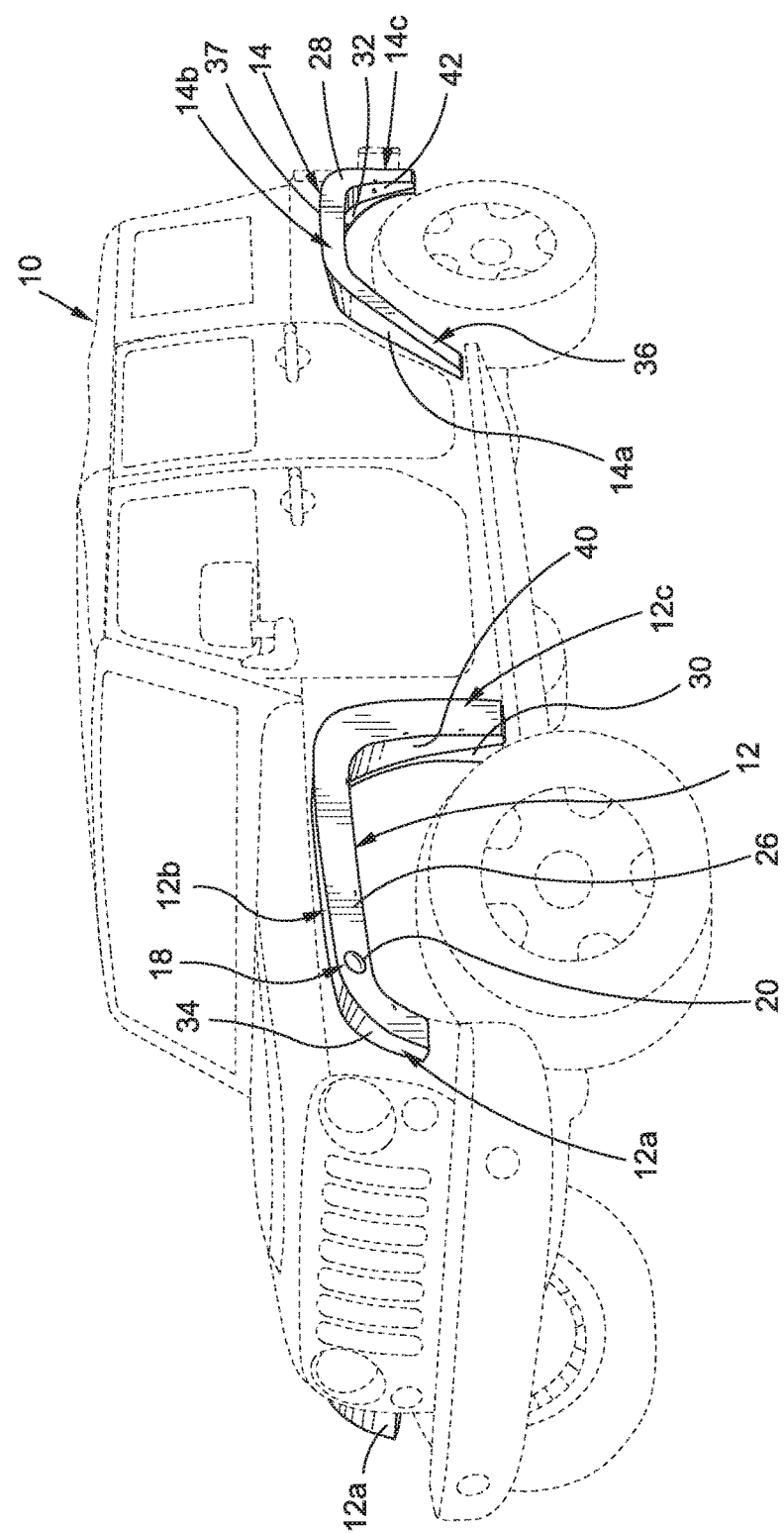
FIG. 1 is a perspective view of a left side of a Jeep® brand vehicle showing a left front fender and left rear fender, with the opposing side being a mirror image thereof.
Figure 2:
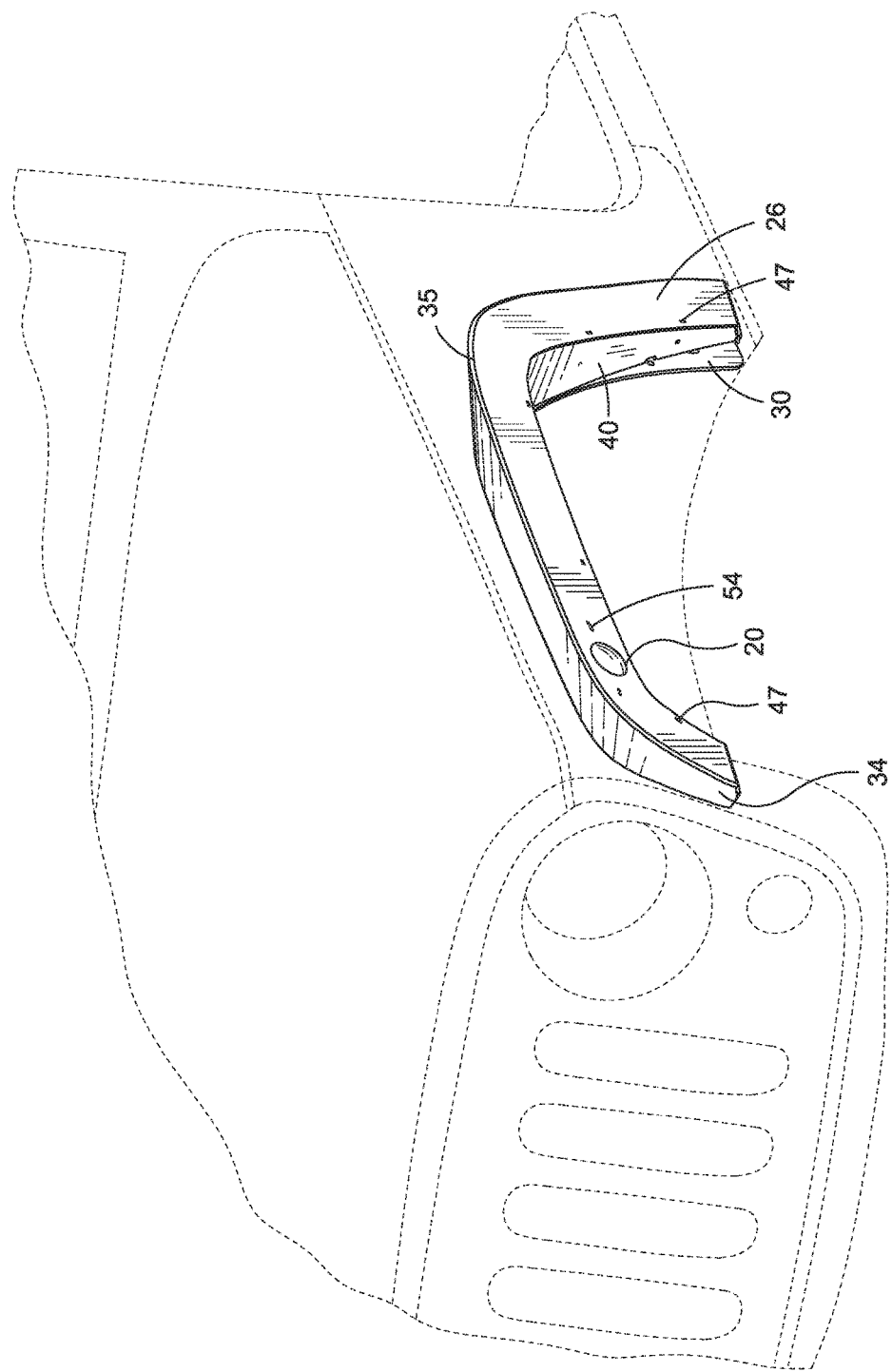
FIG. 2 is a perspective view of the left front fender of FIG. 1 with no turn indicator, with the fender on the opposing side of the vehicle being a mirror image thereof.

Referring to FIG. 1, as used herein, the relative directions front and rear, forward and backward, are with respect to the direction a driver of a motor vehicle faces during use when driving down a road. As used herein, the relative directions above and below, top and bottom, upper and lower are with respect to the direction of gravity and the (level) ground on which the motor vehicle drives, with down being in a direction toward the ground, and up being in a direction away from the ground and toward the sky. In some instances, the relative terms inner and outer may refer to relative vertical directions toward or away from the wheel partially encircled by the fender. The lateral direction refers to the directions toward or away from the plane through the midline of the motor vehicle. Thus, directions such as inward and outward are with respect to the center plane of the vehicle. As also used herein, the reference to "substantially" refers to a variation of 20%.

Referring to FIGS. 1-23, a motor vehicle 10 has front and rear fenders 12, 14, respectively connected to the vehicle, with each fender above a different wheel. As the front fenders 12 are mirror images of one another, only one is described—the left front fender (FIGS. 1-13). Likewise, as the rear fenders 14 are mirror images of one another, only one is described—the left rear fender (FIGS. 1 and 14-23). The fenders 12, 14 replace the factor-installed fenders and are removably connected to and extend outward from the body of the vehicle 10. Each fender 12, 14 is located above a respective front or rear wheel. As used herein, the vehicle center plane refers to the vertical plane through the longitudinal axis of the vehicle, located equidistant between the two front fenders 12 and the two rear fenders 14.

Each fender has a front end 12*a*, 14*a*, a back end 12*c*, 14*c*, and a middle portion 12*b*, 14*b* intermediate the front and back ends. The fenders 12, 14 advantageously have a four-sided cross-section formed from an opposing top and bottom and an opposing inner side and outer side, and each of these parts has a front end corresponding to end 12a, 14a of the fenders, and has a middle portion corresponding to middle portion 12b, 14b of the fenders, and has a rear end corresponding to rear end 12c, 14c of the fenders. To avoid complexity in part numbers and drawings those front, rear and middle portions of the top, bottom and inner and outer sides are not given separate part numbers but have locations corresponding to the named and numbered parts of the fenders 12a, 14a, 12b, 14b, 12c and 14c.

Both fenders 12, 14 are closer to the vehicle center plane at the front and back of each fender, than at a location in the middle portion of the fender. Thus, each fender 12, 14 has a smaller lateral width in the lateral direction at its front and back ends than at a location in the middle portion of the fender, so the middle 12b, 14b of each fender is further away from the vehicle center plane than the front and back ends of the fender. When viewed along an axis parallel to the center plane of the vehicle and from the front of the vehicle 10, the outer, lateral periphery of each fender angles outward from the front 12a, 14a toward the middle 12b, 14b of the respective fender. This outward inclination or outward taper on the front portion of the fenders helps deflect vegetation away from the center plane of the vehicle and away from the body of the vehicle and the wheel associated with each fender, rather than directly impact the vegetation. The rearwardly and outwardly inclined front ends 12a, 14a are believed to more gradually increase the lateral forces exerted by the fender on the deflected vegetation.

The back end 12c, 14c of each fender 12, 14 is preferably also short. If the vehicle 10 has a running tube along the bottom side of the vehicle body, below the vehicle's doors and extending from adjacent the front tire to the rear tire, then the lateral width of the back of the fenders matches the distance that the running board extends outward from the vehicle body. If there is no running board extending outward from the side of the vehicle then the lateral width of the back end 12c, 14c of each fender is preferably about the same as the lateral width of the front end 12a, 14a of the respective fender 12, 14. The resulting inward inclination or inward taper on the back ends 12c, 14c is believed to avoid sudden release of forces on vegetation urged laterally outward by the front and middle portions of the fender, so the vegetation does not slap as hard against the middle of the vehicle between the wheels and does not slap as hard against the rear fender of the vehicle. The rearwardly and inwardly inclined back ends 12c, 14c are believed to more gradually release the lateral forces exerted by the fender on the deflected vegetation.

The front fenders 12 have turn signals 18 extending through openings 20 in each fender 12. Advantageously, the front fenders 12 are formed with opening 20 configured to receive the pre-existing, factory-installed turn signal 18 in an outward facing surface, using the same wire harness 22 provided with the factor installed signal. Thus, the front fenders 12 are configured and located to allow the factory installed front turn signals 18 and harness 22 to be used. If a turn signal is present on the rear fender, the same design features and considerations apply to that rear fender as apply to the front fender, but the description is not repeated in detail or in the figures.

The fenders 12, 14 each have an outer side 26, 28, respectively, each of which is in a substantially flat plane but advantageously is slanted slightly downward and inward toward the central plane of the vehicle. As the top edge of the juncture of the outer sides 26, 28 with the respective top cover 34, 36 extends further from the body of vehicle 10, any vegetation sliding along one of the fenders 12, 14 is believed to slide along the top edge of the outer side 26, 28. Sliding along the edge compared to sliding along the entire side surface is believed to help reduce scratches along the entire generally vertical face of the outer sides 26, 28 and the incline can help shield or reduce the impact of vegetation on the light 18 as the vegetation slides along the sides outer 26, 28 of the vehicle.

Because the outer sides 26, 28 have front and rear ends extending downward, the outer periphery and outer edge of these parts face forward at the front end and faces rearward at the rear end of the outer sides 26, 28 and faces upward at the middle portion of the sides 26, 28 during use. Because the outer sides 26, 28 have front and rear ends extending downward, the inner periphery and inner edge of these parts face rearward at the front end and faces forward at the rear end of the outer sides 26, 28 and faces downward at the middle portion of the outer sides 26, 28 during use. As used herein, references to the upper and lower edges, or the inner and outer edges (or peripheries) of these outer sides 26, 28 with curved ends nominally refer to the relative orientations of these sides in the vertical direction but encompass edges (or peripheries) that may face various directions when these parts are in the vertical orientation. The same applies to the edges of the inner sides 30, 32.

Figure 3:
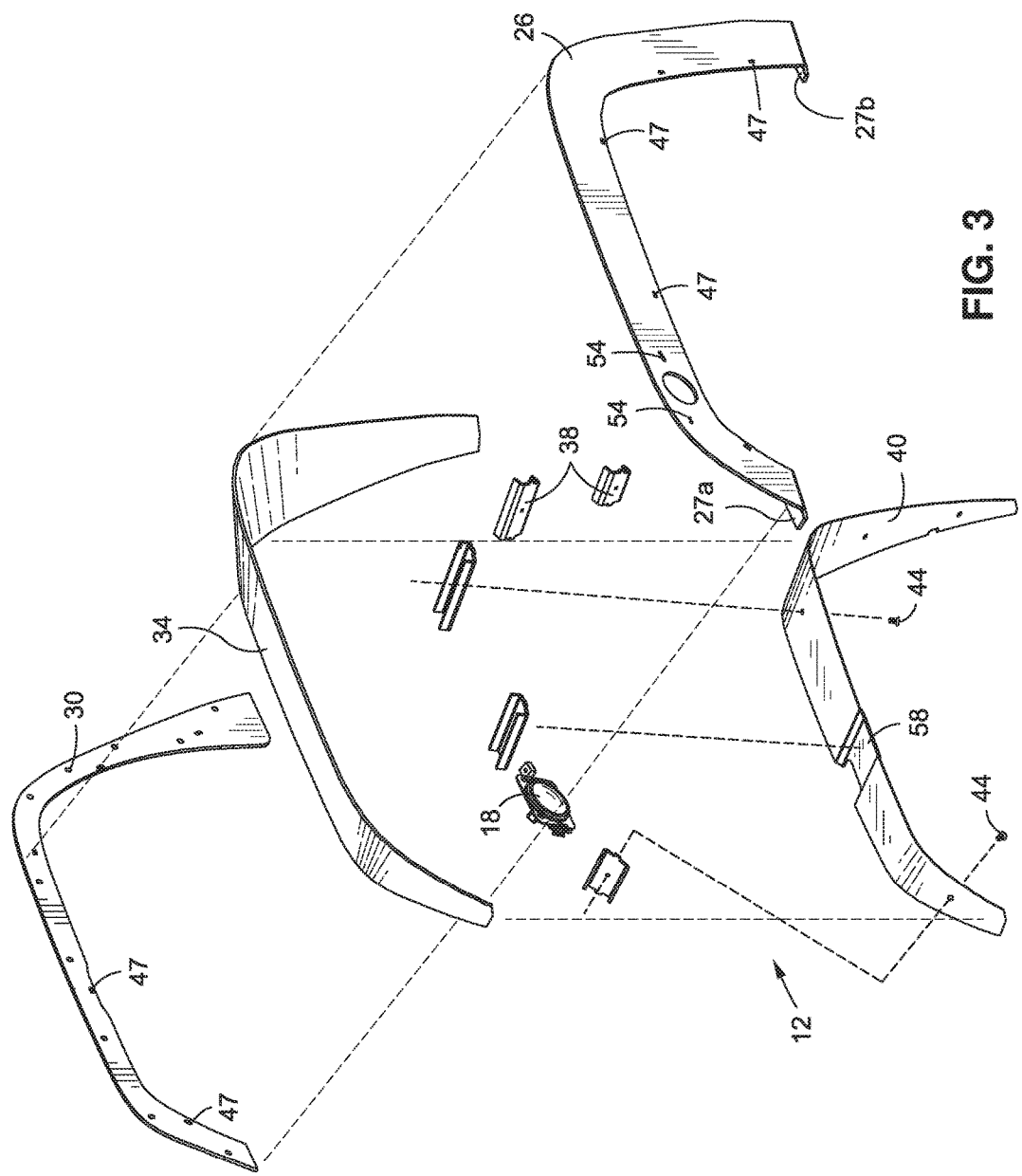
FIG. 3 is an exploded perspective view of the front fender of FIGS. 1 and 2, with the fender on the opposing side of the vehicle being a mirror image thereof.

The fenders 12, 14 also each have an inward side or inner side, 30, 32 opposite the respective outward side 26, 28, so that sides 26, 30 are opposite each other and sides 28, 32 are opposite each other. The inward sides 30, 32 each form a mounting plate and are configured to connect to a mating portion of the motor vehicle 10 as described later. The inward sides 30, 32 which form the mounting plates may be flatter and more vertical than outer sides 26, 28. The inward sides 30, 32 preferably configured to conform to the shape of the abutting surface of the vehicle 10. The inner sides 30, 32 conform to the shape of recessed flanges 64, 94, respectively, which are discussed later. The inner sides have a front end extending downward and a rear end extending downward, with an intermediate middle portion as best seen in FIG. 3. The inner sides 30, 32 each have an outer periphery extending along the outer edge, and an inner periphery extending along the inner edge.

Because the inner sides 30, 32 have front and rear ends extending downward, the outer periphery and outer edge of these parts are correctly stated for the middle portion of the sides but the outer edge faces forward at the front end and faces rearward at the rear end of the sides 30, 32, and faces upward at the middle portion of the sides 30, 32 during use. Because the inner sides 30, 32 have front and rear ends extending downward, the inner periphery and inner edge of these parts is accurately stated for the middle portion of these sides 30, 32 but those sides also face rearward at the front end and faces forward at the rear end of the sides 30, 32, and faces downward at the middle portion of the sides 30, 32 during use. As used herein, references to the upper and lower edges, or the inner and outer edges (or peripheries) of these sides 30, 32 with curved ends nominally refer to the relative orientations in the vertical direction but encompass edges (or peripheries) that may face various directions when these parts are in the vertical orientation. The same applies to the edges of the outer sides 26, 28.

The distance between the inner and outer edges of the inner sides 30, 32 is fairly constant except at the rear portion of the fender 12c, 14c, where both sides widen toward the bottom end of the fender. The outer sides 26, 28 also widen at this corresponding location but not as much as the inner sides. Despite this widening at the rear end, the inner sides 30, 32 and outer sides 26, 28 are described herein as having substantially the same shape and substantially the same height or substantially the same distance between opposing edges.

The distance between the inner and outer edges of the sides 30, 32 is substantially constant except at the rear portion of the fender 12c, where both sides widen toward the bottom end of the fender, with the inner side 30 widening much more than the outer side 32.

The inner side 26, 28 of each fender having a turn signal on the fender, may have an optional wiring access opening in the side (not shown), which is configured to allow the wiring harness 22 to pass through the opening to install turn signal 18, and if needed is large enough to allow the turn signal 18 to pass through and be installed.

The fenders 12, 14 have upwardly facing tops 34, 36, respectively, each of which is generally horizontal but is inclined downward toward the ground and inward toward the center plane of the vehicle. The slight downward incline is believed to help avoid scratches on the entire surface 34, 36 by downwardly extending vegetation and debris.

Extending between opposing sides 26, 30 and 32, 34 are a plurality of braces 38, preferably formed by open channels and more preferably by channels having a U-shaped cross-section with short legs on the U-shaped cross-section. The opposing ends of the braces 38 are preferably welded to the adjacent side 26 and 30, or adjacent sides 28 and 32, between which the braces 38 extend. The braces 38 may optionally be welded to the respective top 34, 36 joining the upper edges of the respective sides 26 and 30, and 28 and 32. The braces stiffen the fenders 12, 14. The braces 38 are preferably of metal, with 9 gage metal believed suitable, and mild steel or stainless steel preferred, having a thickness of about 0.15 inches.

The fenders 12, 14 also each have a bottom cover 40, 42, respectively, facing downward toward the tire below each fender, and the ground on which the tire rests during use. The bottom cover 40 is preferably located at or very near to the bottom edge of the respective sides 26 and 30 and extends between and is welded to each opposing side. The bottom cover 42 is preferably located at or very near to the bottom edge of the respective sides 28 and 32 and extends between and is welded to each opposing side. The bottom covers 40, 42 are preferably removably fastened to the associated fender 12, 14. This removable fastening can be achieved by threaded fasteners 44 (FIGS. 2, 15) passing through the bottom cover 40, 42 and into an associated brace 38. If the U-shaped braces 38 are oriented with their open end facing the tops 34, 36 then the base of the U-shaped channel provides a wide surface extending between opposing sides 26 and 30, and between 28 and 32, and the threaded fasteners can engage that wide surface. Using bottom covers 40, 42 to close the fenders allows easier cleaning and greatly reduces entrapment of mud, seeds, dirt, insects and other debris. The smooth surface at the bottom end of the outer side wall 26, 28 also allows easier access to the underside of the fender for cleaning as it reduces the size of the cavity enclosed by inner and outer and upper walls of the fender.

Figure 6:
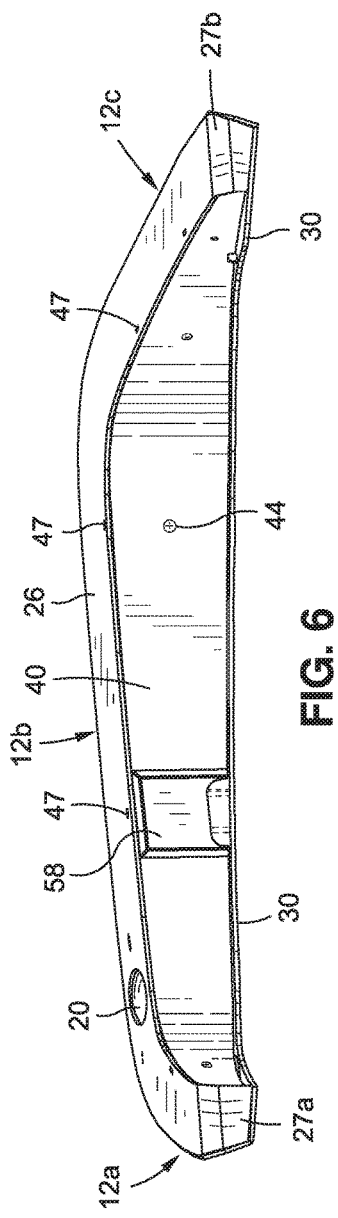
FIG. 6 is a bottom view of the front fender of FIG. 4 with the front end of the fender to the left as shown in FIG. 6, and with the fender on the opposing side of the vehicle being a mirror image thereof.

As best seen in FIGS. 3 and 6, the front and rear ends of front fender 12 (and rear fender 14) which are at the bottom of the fender and thus closest to the ground during use, are closed. This is achieved by bending either the outer or inner sides 28, 30 at the opposing distal ends, to conform to the shape of the bottom cover 44 and top 34. As seen in FIG. 3, the bottom end of the outer side 26 is bent generally horizontal to form laterally extending, bottom end 27a at the front of the side 26, and laterally extending, bottom end 27b at the rear of the side 26. The bottom ends 27a, 27b extend across the width of the adjacent ends of top cover 34 and contact inner side 30 and are preferably welded to the bottom end of the inner side 30. The bottom cover 44 blocks entry of water, mud, vegetation and debris thrown against the inside of the fender 12 during use. The bottom end 27a, 27b block water and debris from entering the fender 12 from the bottom ends of the fender. The fit between the bottom cover 40 and the sides 28, 30 at the bottom ends 27a, 27b may be such as to allow any moisture that enters the inside of the fender 12 to leak out and thus avoid the collection of water. Alternatively, a discrete drain hole (not shown) may be provided in or adjacent to each opposing end 27a, 27b.

Each fender 12, 14 thus forms a closed structure having two opposing sides 26 and 30 or 28 and 32 that are joined by a top (34 or 36) and bottom (40 and 42). The closed structure has a generally rectangular cross-sectional shape, recognizing that the outer side 26 and top cover 34 may be inclined so as to have an acute internal angle as discussed later. The enclosed structure is believed to form a very strong and sturdy fender that will better resist permanent deformation and/or breakage when impacted by vegetation and debris during use. The strong constructing is also believed to more readily withstand and deflect strong vegetation and undergrowth such as small trees and branches without permanent deformation. This strong construction is achieved in part by continuously welding or spot welding the abutting edges of the top and opposing sides that form each fender. While the closed bottom is removable and thus not as securely joined as if welded, the bottom cover and the forming of an enclosed structural member is believed to greatly increase the stiffness and strength of the fender. While welding is preferred, other releasable connections may be used, such as threaded fasteners and interlocking hooks and loops.

The details of the construction of each fender are better seen in FIGS. 1-23, with FIGS. 1-13 showing the left front fender 12 which is discussed first. As the right front fender is the mirror image in construction and appearance to the left front fender, only the left front fender 12 is described. The outer and inner sides 26, 30 are welded to the top 34 with braces 38 extending between and connected to the opposing sides 26, 30. As best seen in FIGS. 1 and 9-10, the braces 38 are of different lengths, corresponding to the distance between opposing sides 26, 30. As seen in FIGS. 9-10, the braces may have projections 46 or recesses 48 (FIGS. 9-10) on the ends or side wall edges of the brace. The projections 46 may fit into correspondingly shaped openings 47 in the sides 26, 30 to interlock the parts and position them for both ease of assembly and structural stability. Advantageously, the openings 47 are adjacent the lower edges of sides 26, 30 (FIG. 3). The projections 46 may also form offsets to allow welding in the right-angle corners formed by the ends of the brace abutting the sides 26, 30. The recesses 48 may allow passage of electrical wires, as needed. Advantageously, one or more threaded holes 49 (FIG. 10) are formed in the base of each brace 38 to receive fastener 44 to hold the cover 40 onto the brace 38 and thus the fender 12. In the depicted configuration, there are five braces 38, but the number will vary. The ends of the braces 38 are preferably welded to the adjacent or abutting sides 26, 30 adjacent the lower edges of the sides 26, 30.

Figure 5:
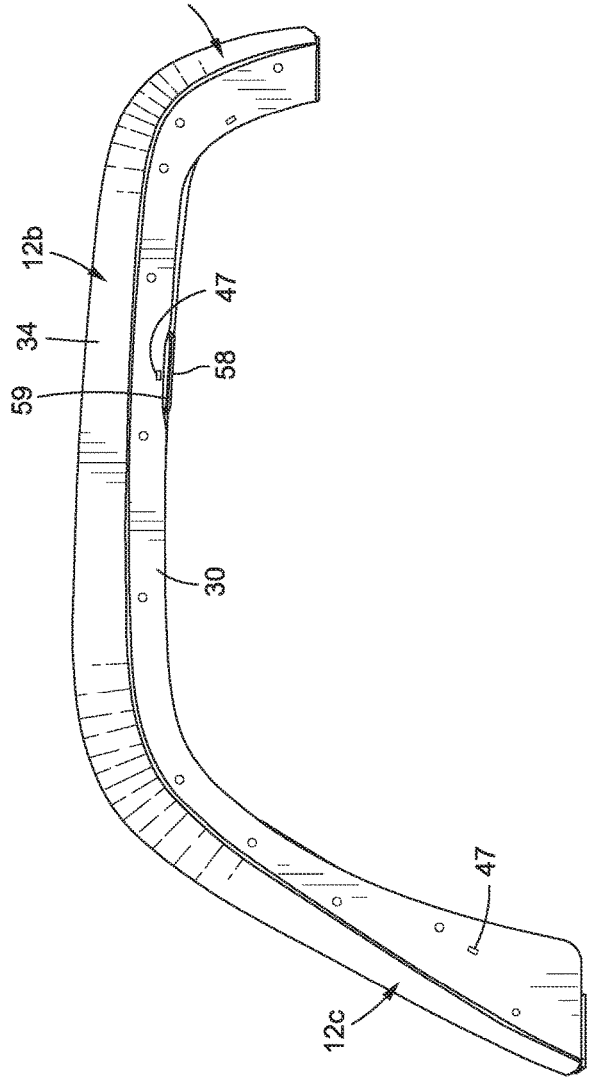
FIG. 5 is a side view of the front fender of FIG. 4, looking from the inside outward, with the front end of the fender to the right as viewed in FIG. 5, with the fender on the opposing side of the vehicle being a mirror image thereof.

As seen in FIGS. 5-6, the bottom cover 40 has a recessed portion 58 and the inner side 30 has a corresponding located slight recess 59. These aligned recesses allow insertion of and connection to a mounting support as discussed later.

The signal indicator 18 is inserted through the hole 20 in the outer side 26 before the bottom cover 40 is fastened to the fender 12. As seen in FIGS. 3 and 9-10, projections 50 on a mounting bracket 52 holding the signal indicator 18 engage mating holes 54 in the outer side 26 to connect the bracket to the side of the fender. A socket 56 on the back of the turn signal 18 connects to a wiring harness (not shown) of the vehicle. The wiring harness has a predetermined length and the fender 12 and opening 20 are located to allow the existing signal indicator 18 and wiring harness be used with the opening 20 and fender 12. A wire harness passage hole (not shown) through inner wall 30 is located as needed to allow passage of the wiring harness to the inside of the fender 12 (or 14).

Figure 11:
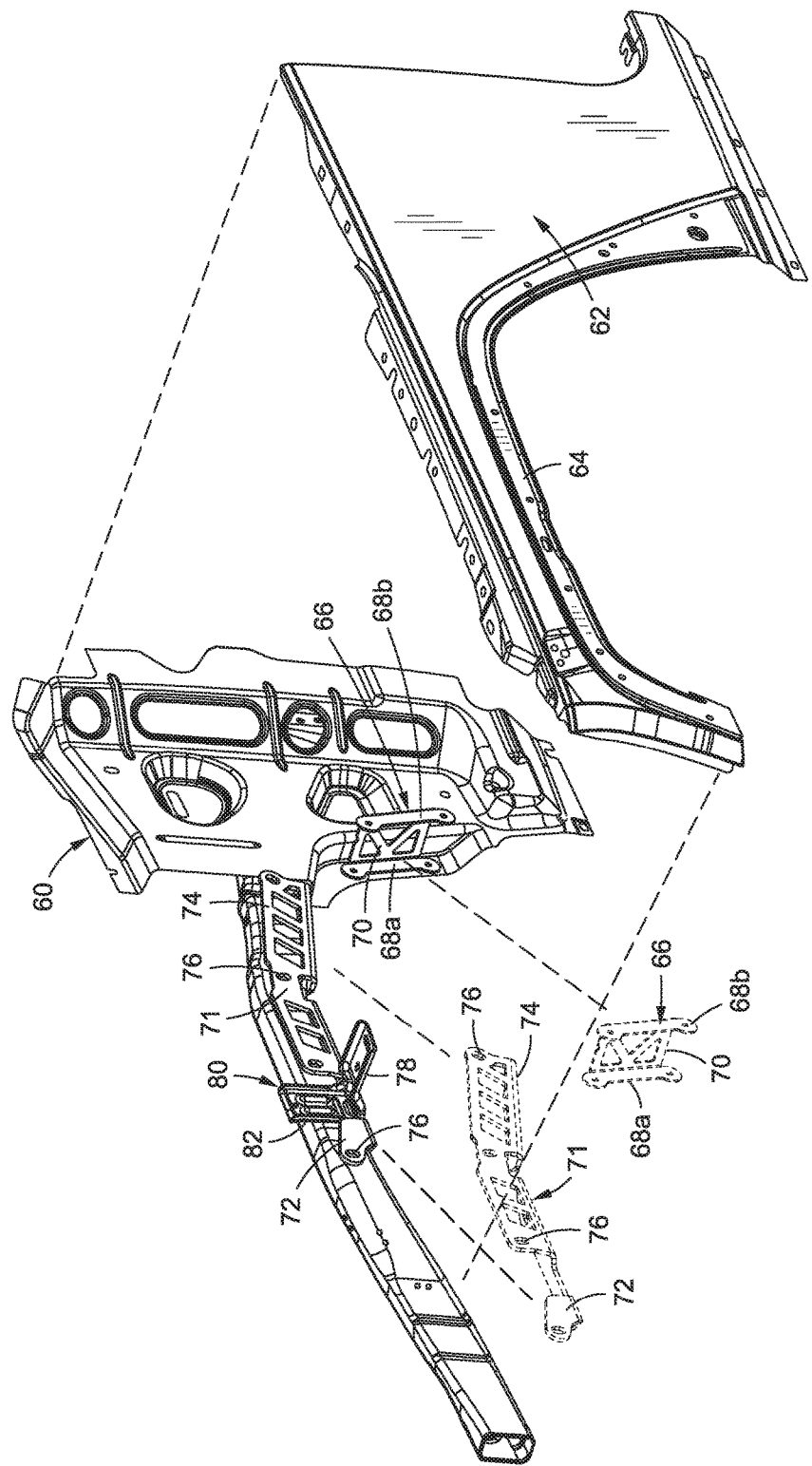
FIG. 11 is an exploded perspective view showing the location of mounting brackets on a left front portion of a motor vehicle to which the left front fender mounts, with the opposing side of the vehicle being a mirror image thereof.
Figure 12:
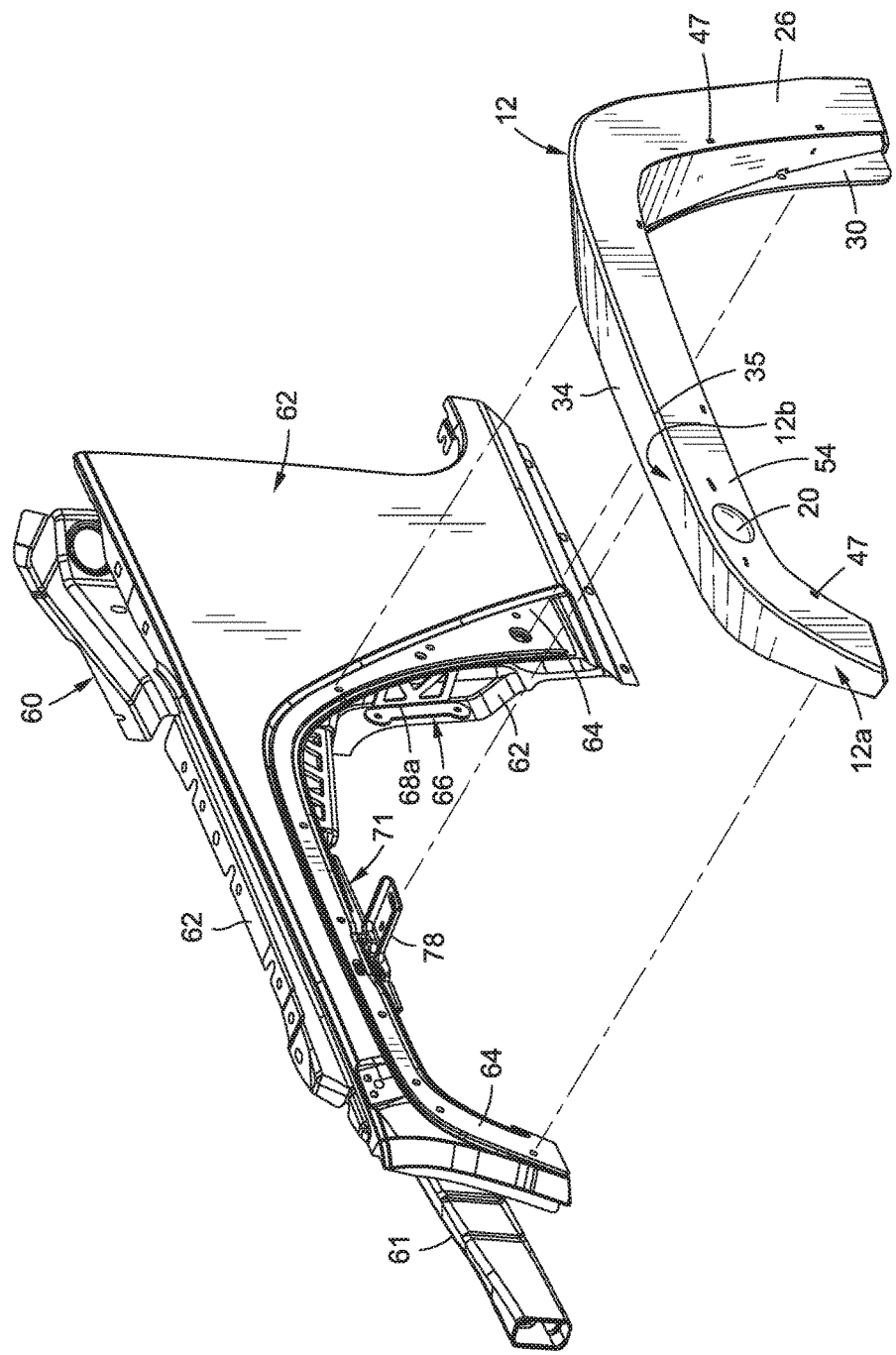
FIG. 12 is an exploded perspective view of a left front portion of the motor vehicle of FIG. 1 and the left front fender, with the opposing side of the vehicle being a mirror image thereof.
Figure 13:
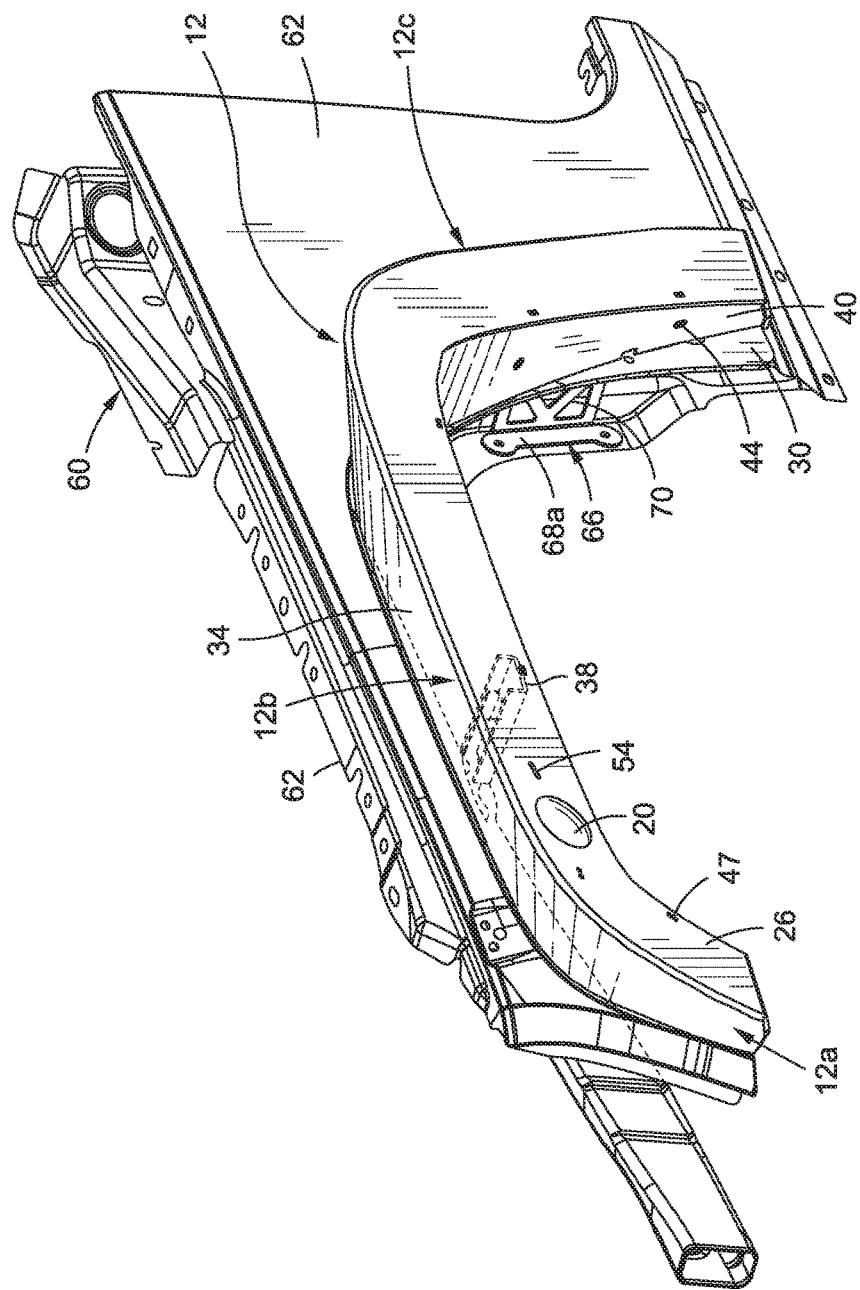
FIG. 13 is a perspective view of a left front portion of the motor vehicle of FIG. 12 with the fender on the vehicle, and with the opposing side of the vehicle being a mirror image thereof.
Figure 14:
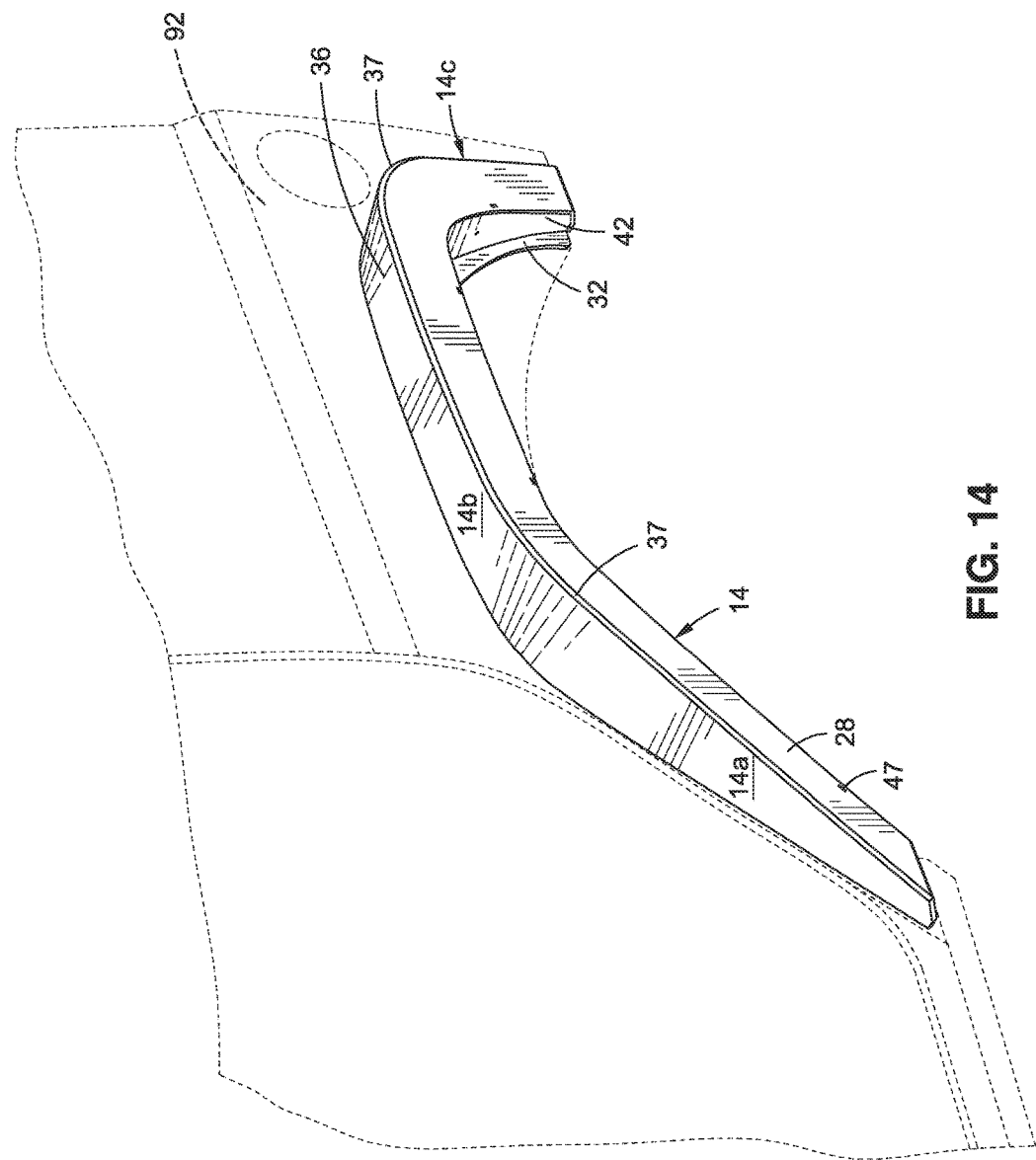
FIG. 14 is a perspective view of the left rear fender of the vehicle of FIG. 1.

When assembled, the fender 12 forms a single part with an enclosed outer surface (26, 30, 34, 40) and internal stiffeners 38. The inner side 30 of the fender 12 is removably connected to the front side of the vehicle 10 at the same general location as the original, factory-installed fender. As shown in FIGS. 11-13, the vehicle has an internal structural frame 60 at the left, front part the vehicle where the left wheel and tire are located. The frame 60 includes upper beam 61 extending above the left front wheel. An outer, left front panel 62 with a recessed flange 64 fastens to the internal structural frame 60. The recessed flange encircles a portion of the front wheel and tire in use, and also encircles a portion of the wheel well located inward of the panel left front panel 62. The frame 60, beam 61, panel 62 and recessed flange 64 each have a plurality of factory formed fastening holes for receiving threaded fasteners to bolt the outer panel 62 to the frame 60 and/or beam 61, to connect to the factory-installed fender (not shown), and to pass the wire harness to the turn signal. The recessed flange 64 is shaped to receive the factory-installed fender and has preformed fastener holes to align with mating holes in the front fender.

Referring further to FIGS. 11-13, The fender 12 preferably has the inner side 30 conform to the shape of the original, recessed mounting flange 64 and holes aligned with at least some of the original fastener holes, and preferably, but optionally, as many original fastener holes as possible are used to connect the flange 64 to the inner side 30. A first, lateral bracket 66 has a first side 68*a* bolted to the frame 60 and a second, opposing and generally parallel side 68*b* located outward of the first side and configured to bolt to and support the front panel 62, preferably bolting to the inside of the flange 64 and along the rear portion of the flange. The sides 68*a*, 68*b* are connected by a web 70 to form a generally U-shaped structure with the web 70 forming the bottom of the U, and with the sides 68*a*, 68*b* extending forward. The lateral bracket 66 extends laterally from the frame 60 outward to support the front panel 62 adjacent locations where the fender 12 fastens to the front panel 62. The lateral bracket 66 may be bolted to the frame 60 and front panel 62, or welded, or both. The lateral bracket 66 forms a brace having opposing flanges 68*a*, 68*b* parallel to the inner side 30, with one of the flanges configured to connect to the vehicle via the recessed flange 64 and the other flange configured to connect to the fender 12 during use in order to further support and stabilize the vehicle and fender.

A second bracket, referred to as frame mounting bracket 71, preferably takes the form of an elongated and thin bracket having a front end 72 connected to the beam 61 and a rear end 74 connected to a rear portion of the beam 61, preferably using threaded fasteners through fastener holes 76. The support bracket 70 has a mounting support 78 extending laterally from the bracket 70 adjacent the front end 72. The mounting support 78 extends below and outward of the flange 64 on the front panel 62. The mounting support 78 is the lower leg of an L-shaped bracket 80 having a vertically extending leg 82. The bracket 80 connects to the second bracket, frame mounting bracket 71. The bracket 71 thus comprises an elongated support having opposing ends configured to connect to the vehicle during use, and a lateral mounting support 78 extends generally parallel to the bottom cover 42 and has a length sufficient to extend to a location adjacent to but not extending beyond the outer side 26 at the middle portion of the fender 12.

The frame mounting bracket 71 provides a stronger and more stable support for the bracket 80 and laterally extending mounting support 78. The frame mounting bracket 71 is preferably shaped to conform to the contour of the beam 61 and to abut the beam 61 along the length of the frame mounting bracket 71. The frame mounting bracket 71 is preferably made of 5 gage metal, preferably mild steel and more preferably stainless steel, having a thickness of about 0.22 inches.

In use, the inner side 30 of the front fender 12 is preferably shaped to conform to the recessed flange 64 on the front panel 62 of the vehicle. The inner side 30 is preferably connected to the recessed flange 64 by threaded fasteners through the existing fastener holes. The mounting support 78 preferably extends through the recess 59 (FIG. 5) and into recess 58 (FIG. 6) where the support 78 is fastened to the bottom cover 40 by threaded fasteners (not shown) passing through holes in the support 78 and into brace 38 of the fender 12. The lateral brace 6 stiffens the front panel 62 and advantageously, but optionally, the front fender 12 may fasten to both the panel 62 and bracket 66 at a location mid-way along the vertical length of the rear portion of the fender 12. The assembled front fender 12 is heavier than the factory-installed fender and the brackets 66, 71 and mounting support 78 are added to help support the extra weight of the fender and to provide a suitably stiff connection to the vehicle frame 60 and beam 61 of the vehicle 10.

Figure 4:
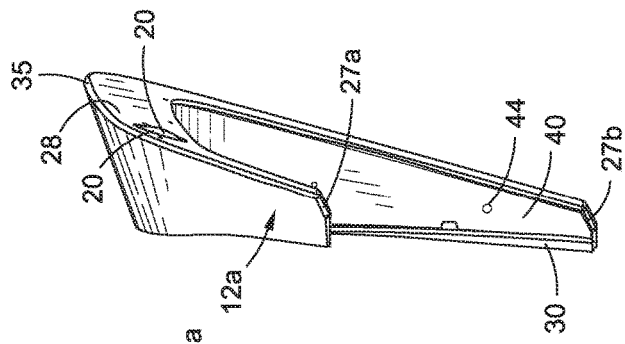
FIG. 4 is a front view of the front fender of FIGS. 1 and 2, with the fender on the opposing side of the vehicle being a mirror image thereof.

As best seen in FIGS. 4 and 13, the upper surface of the fender 12 is inclined downward toward the ground and inward toward the center plane of the vehicle 10. Advantageously, the downward angle is about 15-25 degrees to the horizontal, and more preferably about 20 degrees to the horizontal. For the top cover, the downward angle may decrease at the front 12*c* and rear 12*c* of the fender. Likewise, the outer side 28 is inclined downward toward the ground and inward toward the center plane of the vehicle. Advantageously, the inward inclined angle of the outer side 28 relative to the vertical is about 5-20 degrees, and preferably about 10-15 degrees and more preferably about 12 degrees. For the outer side 28, the inclined angle is preferably constant at the front, middle and rear portions of the fender. The inwardly and downwardly inclined outer side 26 and top 34 forms a vertex 35 (FIG. 4) at their juncture which, because it is at the juncture of the angled side and top, is a very strong and protruding part of the fender 14 and extends from the front to the rear of the fender.

The vertex 35 is believed suitable to deflect vegetation away from the flatter surfaces of the fender 12 and thus to reduce damage and scratching of the outer side 26 and top 34.

As best seen in FIGS. 4 and 6, the inner side 30 is preferably in a generally flat plane, although the front and rear ends of the fender may curve inward slightly (a few degrees) to conform to the shape of the body of the vehicle 10.

Figure 15:
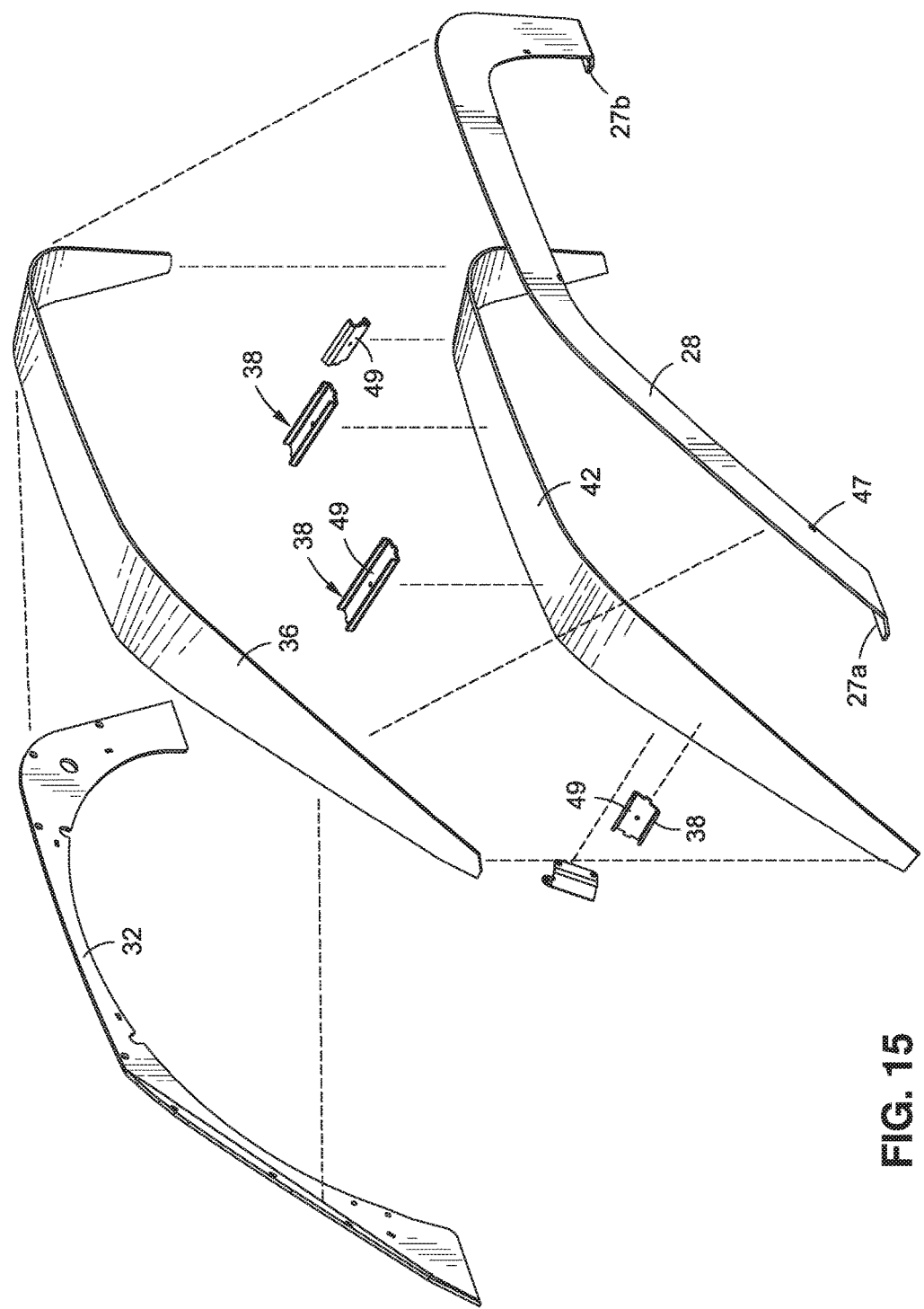
FIG. 15 is an exploded perspective view of the left rear fender of FIG. 14, with the opposing rear fender being a mirror image thereof.
Figure 16:
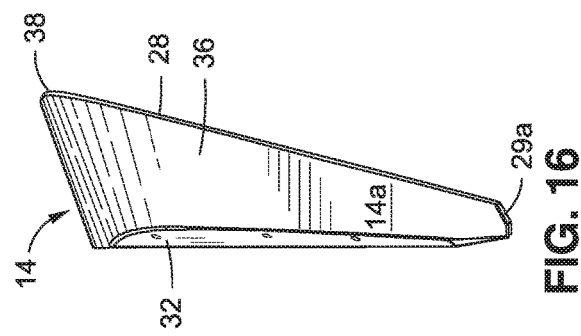
FIG. 16 is a side view of the left rear fender of FIGS. 1 and 14-15, looking in the forward direction from the back of the vehicle.
Figure 17:
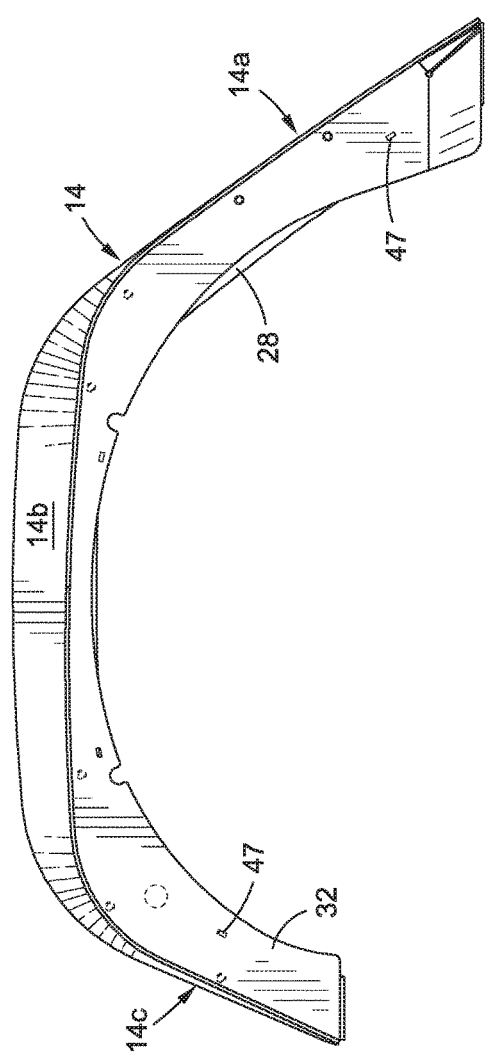
FIG. 17 is a side view of the fender of FIG. 16, looking from the inside of the vehicle outward, with the front end of the fender to the right as viewed in FIG. 17.

FIGS. 14-20 show the left rear fender 14 which is discussed next. As the right rear fender is the mirror image in construction and appearance to the left rear fender, only the left rear fender 14 is described. The outer and inner sides 28, 32 are welded to the top 36 with braces 38 extending between and connected to the opposing sides 28, 32. As best seen in FIGS. 1 and 15, the braces 38 are of different lengths, corresponding to the distance between opposing sides 28, 30. As seen in FIGS. 9-10, the braces may have projections 46 or recesses 48 as previously described that may fit into correspondingly shaped openings 47 in the sides 28, 32 to interlock the parts and position them for both ease of assembly and structural stability. Advantageously, the openings 47 are adjacent the lower edges of sides 28, 32 (FIGS. 15, 17). The projections 46 may also form offsets to allow welding in the right-angle corners formed by the ends of the brace abutting the sides 28, 32. The recesses 48 may allow passage of electrical wires, as needed. Advantageously, one or more threaded holes 49 (FIG. 10) are formed in the base of each brace 38 to receive fastener 44 to hold the bottom cover 42 onto the brace 38 and thus the rear fender 14. In the depicted configuration, there are five braces 38, but the number will vary. The ends of the braces 38 are preferably welded to the adjacent or abutting sides 28, 32 adjacent the lower edges of the sides 28, 32.

The rear fender is shown as not having a signal indicator 18 (FIG. 7) internally mounted to the fender so as to require an opening 20 (FIG. 1) for the signal indicator. If one is used, the signal indicator is preferably constructed and installed in a manner analogous to front signal indicator 18.

Figure 19:
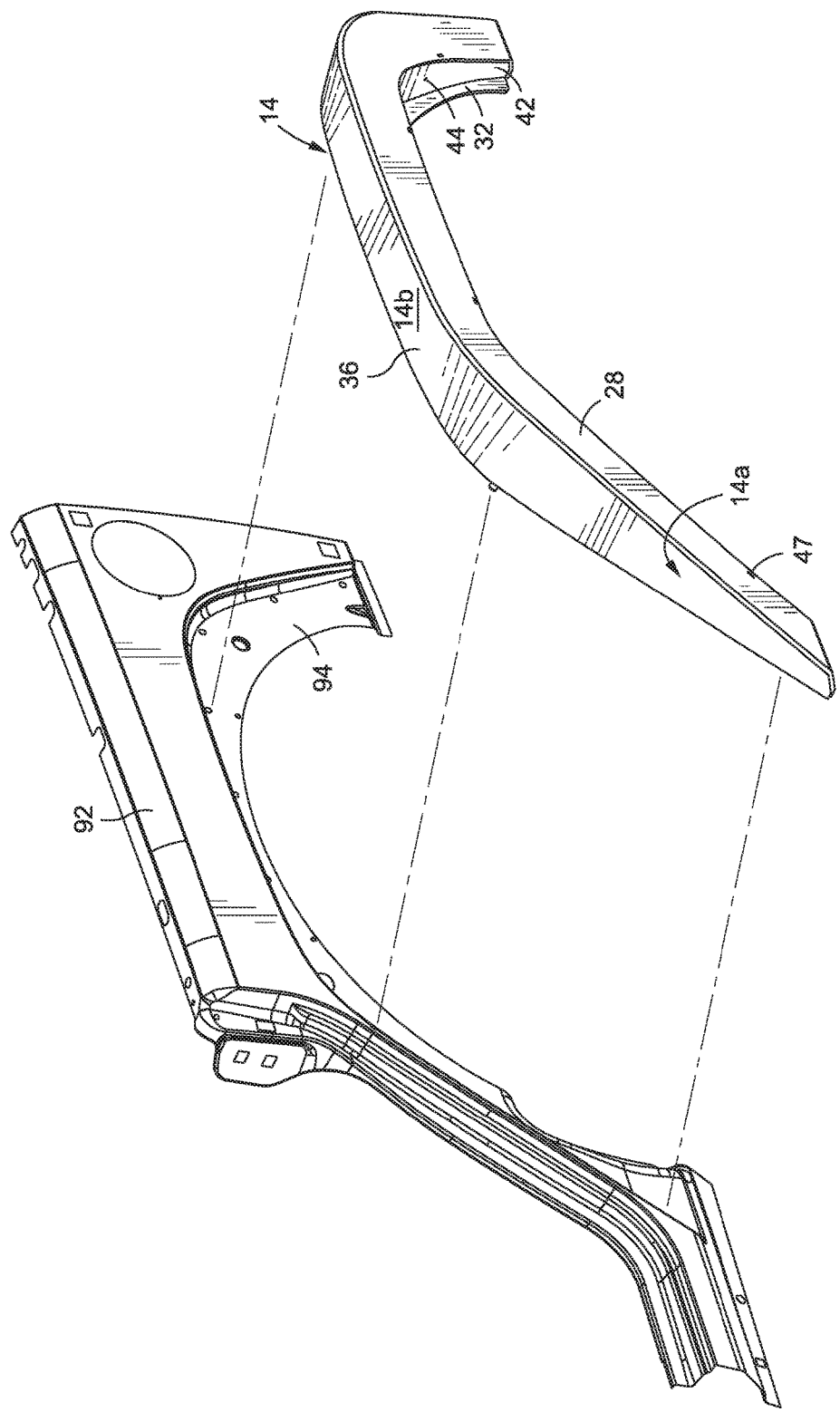
FIG. 19 is an exploded perspective view showing the left rear portion of the vehicle of FIG. 1 and the left rear fender of FIGS. 1 and 14.
Figure 20:
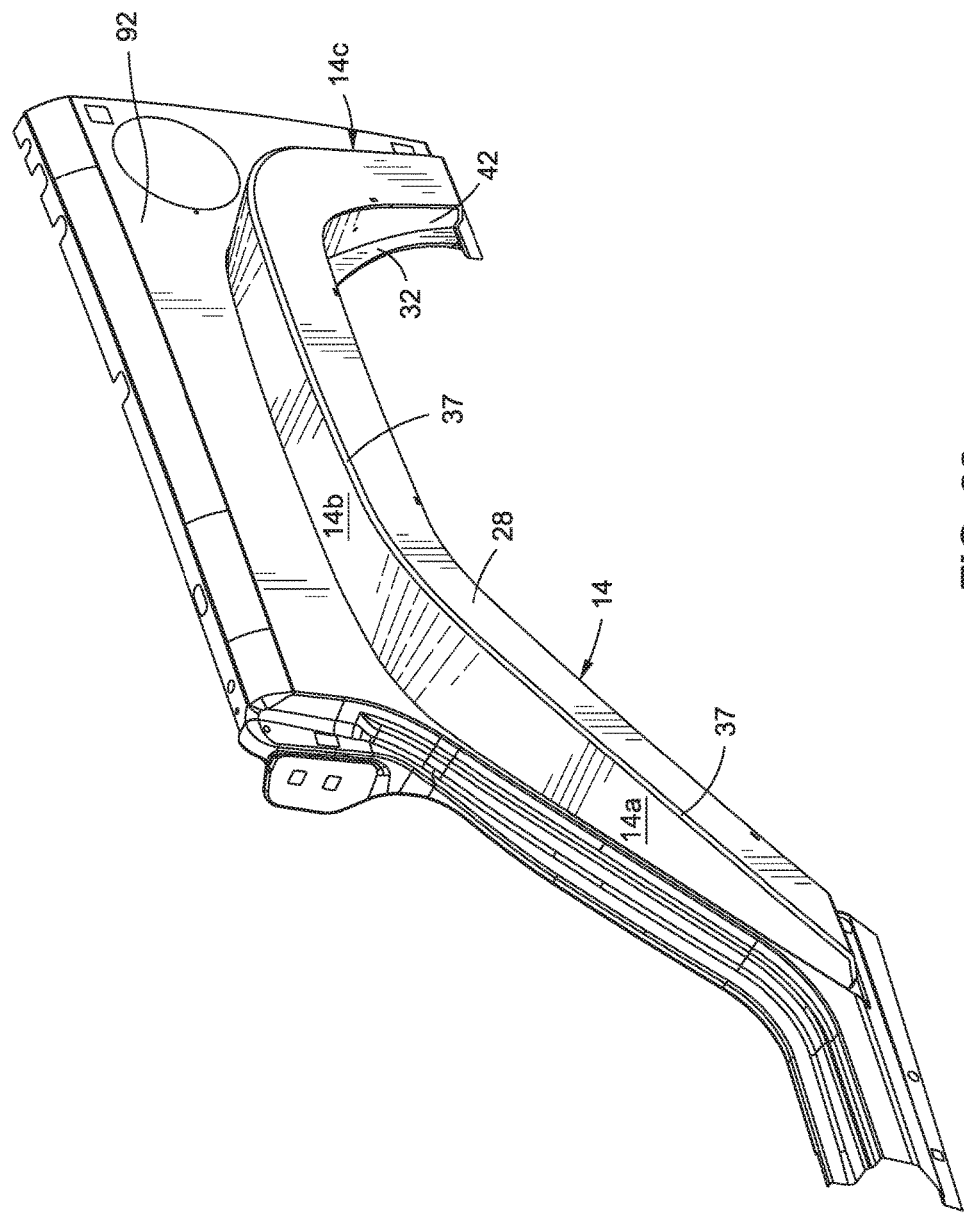
FIG. 20 is a perspective view of FIG. 19 showing the left rear fender on the rear portion of the vehicle of FIG. 1.

When assembled, the rear fender 14 forms a single part with an enclosed outer surface (28, 32, 36, 42) and internal stiffeners 38. The inner side 32 of the fender 14 is removably connected to the rear side of the vehicle 10 at the same general location as the original, factory-installed, rear fender. As shown in FIGS. 19-20, the vehicle has a rear panel 92 at the left, rear part the vehicle where the left rear wheel and tire are located. The panel 92 has a recessed flange 94 forming a recess encircling the top part of the wheel and tire during use, and also encircling a portion of the wheel well located inward of the panel 92. The recessed flange 94 is shaped to receive the factory-installed rear fender (not shown) and has pre-formed fastener holes to align with mating holes (not shown) in the rear fender.

Referring further to FIGS. 15-20, the rear fender 14 preferably has the inner side 32 conform to the shape of the original, recessed mounting flange 94 and holes aligned with at least some of the original fastener holes, and preferably, but optionally, as many original fastener holes as possible are used to connect the flange 64 to the inner side 32. It is not believed necessary to use brackets analogous to lateral bracket 66, 71, 80 or mounting support 78 on the rear fender 14. Such supporting and stiffening brackets may be added as believed appropriate In use, the inner side 30 of the rear fender 14 is preferably shaped to conform to the recessed flange 94 on the rear panel 92 of the vehicle 10. The inner side 32 is preferably connected to the recessed flange 94 by threaded fasteners through the existing fastener holes. The assembled rear fender 14 is heavier than the factory-installed fender but the rear panel 92 and recessed flange 94 are believed sufficiently strong to support the increased weight and provide a suitably stiff connection to the vehicle 10.

As best seen in FIGS. 15 and 17, the front and rear ends of rear fender 14, at the bottom of the fender closest to the ground during use, are closed. This may be achieved by bending either the outer or inner sides 28, 30 at the opposing distal ends, to conform to the shape of the bottom cover 44 and top 34. As seen in FIG. 15, the bottom end of the outer side 28 is bent generally horizontal to form laterally extending, bottom end 29a at the front of the side 28, and laterally extending, bottom end 29b at the rear of the side 28. The bottom ends 29a, 29b extend across the width of the adjacent ends of top cover 36 and contact inner side 32 and are preferably welded to the bottom end of the inner side 32. The bottom cover 42 blocks entry of water, mud, vegetation and debris thrown against the inside of the fender 14 during use. The bottom ends 29a, 29b block water and debris from entering the fender 14 from the bottom ends of the fender. The fit between the bottom cover 42 and the sides 28, 32 at the bottom ends 29a, 29b may be such as to allow any moisture that enters the inside of the fender 14 to leak out and thus avoid the collection of water. Alternatively, a discrete drain hole (not shown) may be provided in or adjacent to each opposing end 29a, 29b.

As best seen in FIGS. 16 and 20, the middle portion of the upper cover 34 of the rear fender 14 is inclined downward toward the ground and inward toward the center plane of the vehicle 10. Advantageously, the downward angle is about 15-25 degrees to the horizontal, and more preferably about 20 degrees to the horizontal. For the top cover 36, the downward angle may decrease at the front 14c and rear 14c portions of the rear fender 14. Likewise, the outer side 28 is inclined downward toward the ground and inward toward the center plane of the vehicle. Advantageously, the inward inclined angle of the outer side 28 relative to the vertical is about 5-20 degrees, and preferably about 10-15 degrees and more preferably about 14 degrees. For the outer side 28, the inclined angle is preferably constant at the front, middle and rear portions of the fender.

The inwardly and downwardly inclined outer side 28 and top 36 results forms a vertex 37 (FIGS. 14, 16) which, because it is at the juncture of the angled side and top, is a very strong and protruding part of the fender 14 and extends from the front to the rear of the fender. The vertex 37 is believed suitable to deflect vegetation away from the flatter surfaces of the fender 14 and thus to reduce damage and scratching of the outer side 28 and top 36.

Figure 18:
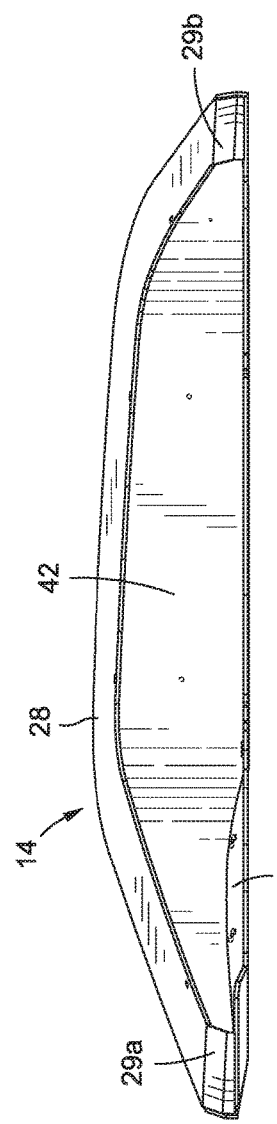
FIG. 18 is a bottom view of the fender of FIG. 16, with the front of the fender to the left as viewed in FIG. 18.

As best seen in FIGS. 16 and 18, the inner side 32 of the rear fender is preferably in a generally flat plane, although the front and rear ends (14a, 14c) of the fender may curve inward slightly (a few degrees) to conform to the shape of the body of the vehicle 10.

Referring to FIGS. 21-24, the width W of the fenders 12, 14 may vary to extend further from or closer to the sides of the vehicle 10. The wider fenders having width W1 of about 6 inches, are believed more desirable when the vehicle 10 has wider tires or larger diameter tires. The narrower fenders with width W2 about 2 to 3 inches are believed more desirable when the vehicle 10 has narrower tires or smaller diameter tires. The wider and narrower terms as used here refer to the lateral distance perpendicular to the center plane of the vehicle.

The drawings of FIGS. 21-23 are to scale, as are the other drawing figures. As seen in FIGS. 21A and 22A, the width W1 of the front fender 12 is smaller at the front end 12a, and wider at the rear portion of the middle 12b, and widest where the front fender begins to curve downward. The rear portion 12c of the front fender goes from the largest width at the top, to the smallest width at the bottom. The width W1 at its widest is preferably about 6 inches for the wide versions, and about 2-3 inches for the narrow versions.

The middle portion of the top covers 34, 36 on the front and rear wheels respectively, are preferably inclined at the same angle, as are the outer sides 26, 28 which have a top edge joining the outer edge of the respective top covers 34, 26 to form the vertex 37. As both the top covers and joined outer sides are inclined inward and downward the angle between the joined top cover and outer sides is an acute angle. Thus, if the top covers 34, 36 are inclined at the preferred angle of 20° and the outer side 26, 28 joined to the respective top covers are inclined at the preferred angle of 15°, a resulting included angle of about 55° is formed between the middle portion of the top cover 34 and outer side 26, and the middle portion of top cover 36 and the outer side 28, resulting in a pronounced vertex 37. The acute angle for the less preferable inclinations of the top covers and outer sides is determined in a similar manner to that described above. As the acute angle approaches 90° the vertex 37 becomes less pronounced and vegetation is believed to more easily impinge on and damage the middle portion of the top covers 34, 36, and the middle portions of the outer sides 26, 28. The acute angle between outer side 26, 26 and the respective top cover 34, 36 is that about 45° to about 65° along the middle portion of the respective fender 12, 14. The middle portion of the top cover 34, 36 may be inclined at an angle of about 15° to about 25° to the horizontal during use, while the middle portion of the outer side 26, 28 is inclined at an angle of about 5° to about 20° to the vertical during use.

As best seen in FIGS. 1, 4 and 16, the middle portion 12*b*, 14*b* of each fender is substantially straight and thus the acute angle formed by top covers 34, 36 and their joined outer sides 26, 28 is substantially the same along the entire length of the middle portions 12*b*, 14*b* of the fenders. The inclination angle of the front and rear ends of the top cover 34, 36 is much less than the inclination angle of the middle portion of those parts, advantageously a few degrees, about 2-5°. Likewise, the inclination angle of the front and rear ends of the outer side 26, 28 is much less than the inclination angle of the middle portion of those parts, advantageously a few degrees, about 1-5°. It is believed advantageous to have the differences in inclination angles change in the curved section joining the middle portion 12*b*, 14*b* of the fender to the front portion 12*a*, 14*a* or to the rear portion 12*c*, 14*c*. Alternatively, the change may be a continuous change from the front of the straight, middle portion 12*b*, 14*b* to the distal end of the front end 12*a*, 14*a* nearest the ground during use, or from the rear of the middle portion 12*b*, 14*b* to the distal end of the rear end 12*c*, 14*c* nearest the ground during use.

The fenders 12, 14 preferably have the inner, mounting sides 30, 32 generally flat and perpendicular to the respective bottom cover 40, 42. The inner sides 30, 32 are thus each in a plane that is generally orthogonal to the respective bottom cover 40, 42 associated with that inner side. The top cover 34, 36 of each fender joins the outer edge of the top cover 34, 36 of each fender joins the upper edge of the respective outer side 26, 28, at an acute, interior angle. That acute angle is opposite the right angle forming the perpendicular joint between the sides 30, 32 and the respective bottom cover 40, 42. A cross-section of each fender 12, 14 taken in a plane orthogonal to a longitudinal axis through the middle of each fender will result in a quadrilateral or four-sided cross-section reflecting the above description along substantially the entire length of each fender's longitudinal axis from the bottom of the front end to bottom of the rear end, and preferably along all the length. The main exceptions to that cross section arise at the recess 58 (FIG. 6) and the recess depicted in FIG. 18 and the "substantially the entire length" encompasses those recesses. But the cross-sectional shapes may optionally be maintained even in those recessed areas.

The top cover is joined to the top edge of each side by a welded joint

The fenders 12, 14 are advantageously made of sturdier material than the original factory fenders provided with the Jeep® brand motor vehicle. The tops 34, 36, mounting plates or inward sides 30, 32, and the outward sides 26, 28 are preferably made of 7 gage metal, preferably mild steel and more preferably stainless steel, having a thickness of about 0.18 to about 0.2 inches. The mounting plates formed by inner sides 30, 32 may be slightly thicker, of 6 gage metal, but also preferably of mild steel and more preferably of stainless steel, having a thickness of about 0.2 inches. The bottom covers 40, 42 may be of thinner metal, and may be made of 16 gage metal, preferably mild steel and more preferably stainless steel, having a thickness of about 0.06 inches. The frame mounting bracket bracket 80 may be of 5 or 6 gage metal, such as mild steel and more preferably of stainless steel, with a thickness of about 0.2 inches.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The above description is given by way of example, and not limitation. Given the above disclosure, one skilled in the art could devise variations that are within the scope and spirit of the invention, including various ways of using various brackets to strengthen the portions of the vehicle to which the fenders 12, 14 connect, and to correctly position connections with the vehicle. Further, the various features of this invention can be used alone, or in varying combinations with each other and are not intended to be limited to the specific combination described herein. Thus, the invention is not to be limited by the illustrated embodiments.

What is claimed is:

1. A fender for a motor vehicle having a body with a recessed flange on the body that encircles an upper portion of a wheel well, the vehicle having a center plane extending vertically through a longitudinal axis through the center of the vehicle and between front and rear wheels of the vehicle, the fender comprising:

a four sided, enclosed structure having depending front and rear ends joined by a middle section, the front and rear ends extending downward, the four sides comprising a substantially flat mounting side, an outer side, a top cover and a removable bottom cover, the mounting side being configured to nest in the recessed flange during use, the outer side being opposite the mounting side with a shape substantially the same as that of the mounting side and a lower edge generally parallel to but offset from a lower edge of the mounting side and an upper edge located above an upper edge of the middle portion of the mounting side, the top cover joined to a top edge of each side along substantially an entire length of each side, the top cover and outer side each having a middle section corresponding in location to the middle section of the enclosed structure with the middle section of the outer side and top cover each inclined inward toward the vehicle's center plane and downward toward the ground, with an acute angle between the middle portions of the top cover and outer side;

a plurality of braces extending between and connected to the mounting side and outer side, the bottom cover and braces having aligned holes for receiving threaded fasteners to releasably fasten the bottom cover to the braces.

2. The fender of claim 1, further comprising an opening in the outer side configured to receive a turn signal light of the motor vehicle.

3. The fender of claim 1, wherein a first downwardly curved section joins the front end to the middle section of the enclosed structure and a second downwardly curved section joins the rear end to the middle section of the enclosed structure.

4. The fender of claim 1, wherein the acute angle is about 45° to about 65°.

5. The fender of claim 1, wherein the middle portion of the top cover is inclined at an angle of about 15° to about 25° to the horizontal during use.

6. The fender of claim 1, wherein the middle portion of the outer side is inclined at an angle of about 5° to about 20° to the vertical during use.

7. The fender of claim 1, wherein the bottom cover is orthogonal to a plane containing the substantially flat mounting side.

8. The fender of claim 1, further comprising a lateral brace having opposing flanges parallel to the mounting side and having an outer side connected to the fender during use and a mounting side connected to the motor vehicle during use.

9. The fender of claim 1, further comprising an elongated support having opposing ends connected to the vehicle during use, and a lateral support extending generally parallel to the bottom cover and having a length sufficient to extend underneath one of the braces and be connected to that one of the braces.

10. The fender of claim 1, wherein the braces have a U-shaped cross-section with a rectangular projection extending outward from opposing ends of the brace, and wherein the mounting side and outer side each have aligned rectangular slots to receive different ones of the projections during use.

11. The fender of claim 1, wherein the top cover is joined to the top edge of each side by a welded joint.

12. The fender of claim 1, wherein the enclosed structure has a four-sided cross-section along substantially all of its length from a bottom of the front end to a bottom of the rear end, which cross-section is orthogonal to a centerline of the fender and has the mounting side and bottom cover perpendicular to each other and forming two of the four sides of the cross-section.

13. The fender of claim 1, wherein the front end of the enclosed structure is shorter than the rear end of the enclosed structure.

14. The fender of claim 1, wherein the front end of the enclosed structure is longer than the rear end of the enclosed structure and has a straight portion inclined forward and downward for a majority of a length of the front end of the enclosed structure.

15. The fender of claim 1, wherein a bottom of front and rear ends of the enclosed structure that are closest to the ground, are each closed so debris cannot enter.

16. A fender for a motor vehicle having a body with a recessed flange on the body that encircles an upper portion of a wheel well, the recessed flange having a generally horizontal middle portion with a front flange end curving downward from a front end of the middle flange portion and a rear flange end curving downward from a rear end of the middle flange portion, the fender, when in the orientation used on the motor vehicle, comprising:

an inner mounting plate that is substantially flat and vertical, the inner mounting plate having the same general shape as the recessed flange and sized to fit in the recess formed by the recessed flange,
  the mounting plate having a middle portion with a generally uniform height and a top edge,
  the mounting plate having a front mounting plate end curving downward and conforming in shape to the front flange end of the recessed flange,
  the mounting plate having a rear mounting plate end curving downward and conforming in shape to the rear flange end of the recessed flange, one of the front and rear mounting plate ends extending downward further than the other;

a top cover having opposed inner and outer edges with the inner edge permanently joined to a top edge of the mounting plate along substantially all of the mounting plate,
  the top cover having a substantially flat middle portion joined to a downward extending front end of the top cover and also joined to a downwardly extending rear end of the top cover,
  the middle portion of the top cover having its outer edge a distance W from the inner edge of the top cover measured along the top cover with that width being smaller at the front of the middle portion of the top cover, and larger at the rear of the middle portion of the top cover,
  the middle portion of the top cover also having its outer edge located a vertical distance above the top edge of the mounting plate so the middle portion of the top cover is inclined inward toward the vehicle and downward toward the ground, an outer side having a front end curving downward and a rear end curving downward, one of the front and rear ends of the outer side extending downward further than the other,
  the outer side having substantially the same shape as the inner mounting plate but with a larger distance between opposing edges of the outer side than the distance between opposing edges of the inner mounting plate along at least the middle portion of the outer side,
  the outer edge of the top cover joined to the top edge of the outer side along substantially all of the top cover and joined along at least the middle portion of the outer cover with an acute angle between the top cover and the outer side;

a plurality of braces extending laterally between and connected to the inner mounting plate and the outer cover; and a bottom cover extending between the inner mounting plate and having a downwardly extending front portion joining a middle portion which joins a downwardly extending rear portion of the bottom cover, a plurality of threaded fasteners connecting the bottom cover to the braces which are located between the bottom cover and the top cover;

wherein the top and bottom covers and the inner and outer sides form a four-sided, closed structure having a four-sided cross-section along substantially all of the length of the inner mounting plate from a bottom of the front end to a bottom of the rear end of the mounting, which cross-section is orthogonal to a centerline of the fender and has the inner mounting plate and bottom cover perpendicular to each other and has the top cover join the outer side at an acute angle along at least the middle portion of the top cover and the outer side.

17. The fender of claim 16, wherein a bottom of the front end closest to the ground is covered by one of the inner mounting plate, outer side, top cover or bottom cover so no debris enter the fender.

18. The fender of claim 16, further comprising an opening in the outer side, configured to receive a turn signal light of the motor vehicle.

19. The fender of claim 16, wherein the acute angle is about 45° to about 65°.

20. The fender of claim 16, wherein the middle portion of the outer side is inclined at an angle of about 5° to about 20° to the vertical.

21. The fender of claim 16, wherein the fender is made of metal and the top cover is welded to the inner mounting side and the outer side.

22. The fender of claim 16, wherein the fender has a downwardly extending rear end that is longer than the front end.

23. The fender of claim 16, wherein the fender has a downwardly extending front end is longer than a downwardly extending rear end with the front end of the fender also having a straight portion inclined forward and downward for a majority of a length of the front end.

* * * * *